United States Patent
Nakai et al.

(10) Patent No.: US 12,418,715 B2
(45) Date of Patent: Sep. 16, 2025

(54) INFORMATION PROCESSING DEVICE, INFORMATION PROCESSING METHOD, AND PROGRAM

(71) Applicant: Sony Group Corporation, Tokyo (JP)

(72) Inventors: Yuki Nakai, Kanagawa (JP); Hironori Hattori, Tokyo (JP); Kazuto Kanda, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 65 days.

(21) Appl. No.: 18/033,197

(22) PCT Filed: May 12, 2021

(86) PCT No.: PCT/JP2021/018046
§ 371 (c)(1),
(2) Date: Apr. 21, 2023

(87) PCT Pub. No.: WO2022/091464
PCT Pub. Date: May 5, 2022

(65) Prior Publication Data
US 2023/0396873 A1    Dec. 7, 2023

(30) Foreign Application Priority Data
Oct. 29, 2020    (JP) ................. 2020-181260

(51) Int. Cl.
*H04N 23/63* (2023.01)
*H04N 7/18* (2006.01)
(Continued)

(52) U.S. Cl.
CPC ........... *H04N 23/633* (2023.01); *H04N 7/181* (2013.01); *H04N 23/61* (2023.01); *H04N 23/632* (2023.01);
(Continued)

(58) Field of Classification Search
CPC ...... H04N 23/633; H04N 7/181; H04N 23/61; H04N 23/632; H04N 23/90; H04N 23/69; H04N 23/695; H04N 23/662
See application file for complete search history.

(56) References Cited

U.S. PATENT DOCUMENTS 9,167,134 B2 * 10/2015 Hirano ................. H04N 13/246
10,825,226 B2 * 11/2020 Cotter .................. H04N 13/239
(Continued)

FOREIGN PATENT DOCUMENTS

CA        2736750 A1 *  3/2010   ......... A63B 24/0021
JP     2008-288745 A     11/2008
(Continued)

OTHER PUBLICATIONS

Cristian Vater et al., of "Detecting single-target changes in multiple object tracking: The case of peripheral vision", (2016) DOI 10.3758/s13414-016-1078-7 (Year: 2016).*

*Primary Examiner* — Dramos Kalapodas
(74) *Attorney, Agent, or Firm* — Paratus Law Group, PLLC

(57) ABSTRACT

There is provided an information processing device that includes a control unit configured to perform image-capture control on the basis of image-capture rendering information indicating a change in captured image and image-capture target information indicating an image-capture target. The term "image-capture" used herein means an operation for obtaining an image using a camera, the "camera" being defined as both a real camera and a virtual camera that virtually changes composition by clipping a part of an image obtained as a result of a light-receiving operation of the real camera.

22 Claims, 26 Drawing Sheets

(51) Int. Cl.
  *H04N 23/61*  (2023.01)
  *H04N 23/90*  (2023.01)
  *H04N 23/69*  (2023.01)
  *H04N 23/695*  (2023.01)
(52) U.S. Cl.
  CPC ............. *H04N 23/90* (2023.01); *H04N 23/69* (2023.01); *H04N 23/695* (2023.01)

(56) References Cited

U.S. PATENT DOCUMENTS

2017/0111576 A1*  4/2017  Tojo ................. H04N 23/90
2019/0089886 A1*  3/2019  Hattori ............. H04N 23/695

FOREIGN PATENT DOCUMENTS

| JP | 2008-301355 A |   | 12/2008 |
|----|---------------|---|---------|
| JP | 2010-016878 A |   | 1/2010  |
| JP | 2013-190569 A |   | 9/2013  |
| JP | 2014-057174 A |   | 3/2014  |
| JP | 5560397 B2    | * | 7/2014  |
| JP | 2014-209768 A |   | 11/2014 |
| JP | 2019180017 A  | * | 10/2019 |

* cited by examiner

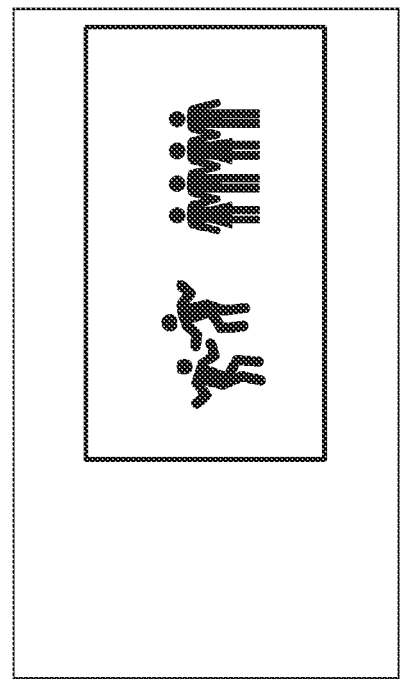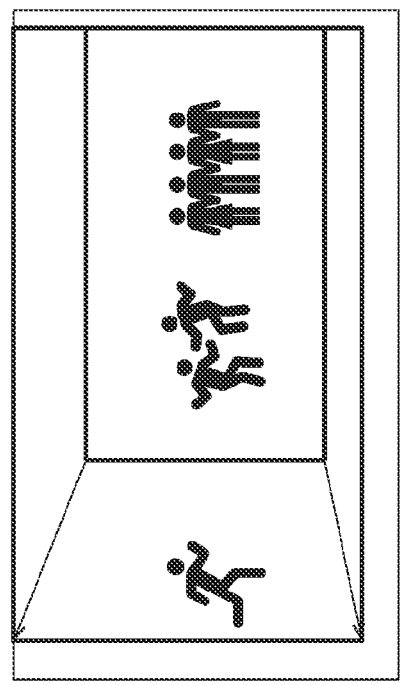
FIG. 5

AUTOMATIC GRADUAL ZOOM

FIG. 9
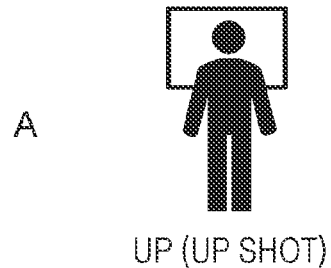
A
UP (UP SHOT)
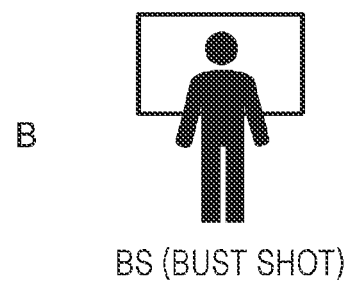
B
BS (BUST SHOT)
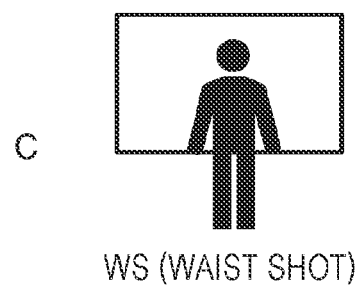
C
WS (WAIST SHOT)
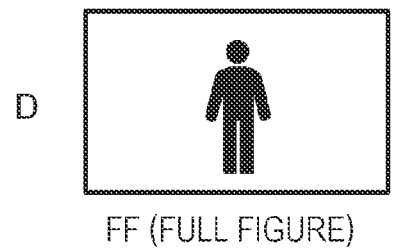
D
FF (FULL FIGURE)

FIG. 10
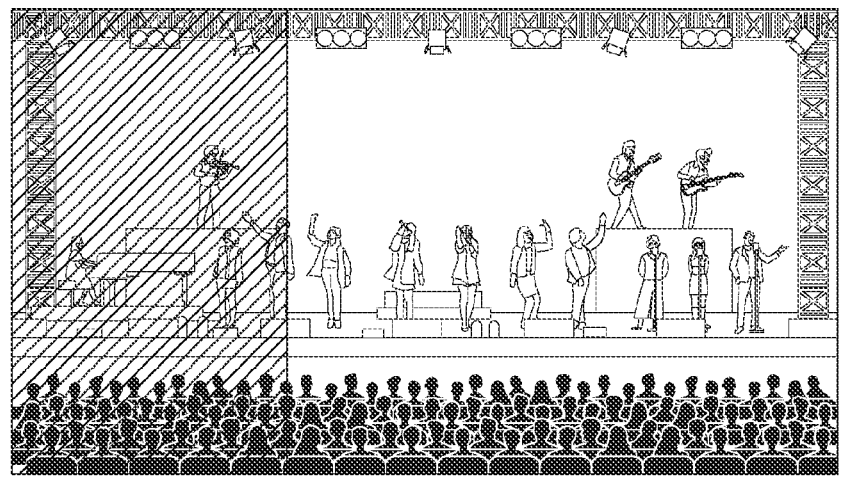
A
LEFT
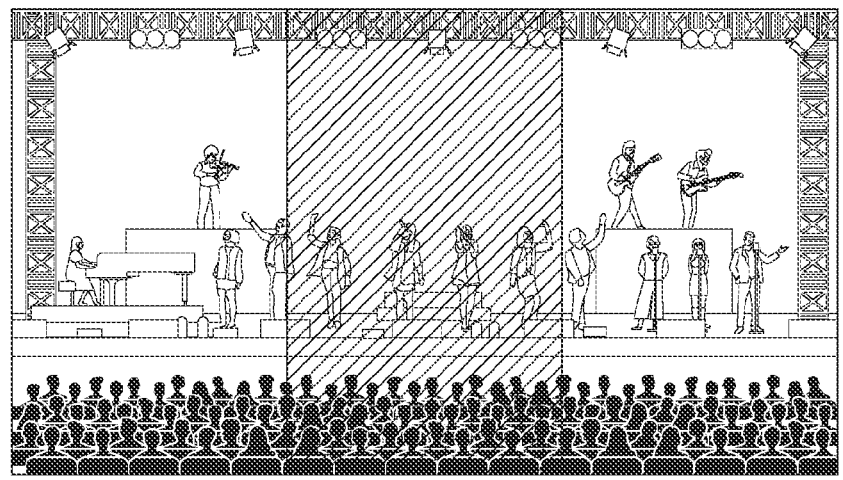
B
CENTER
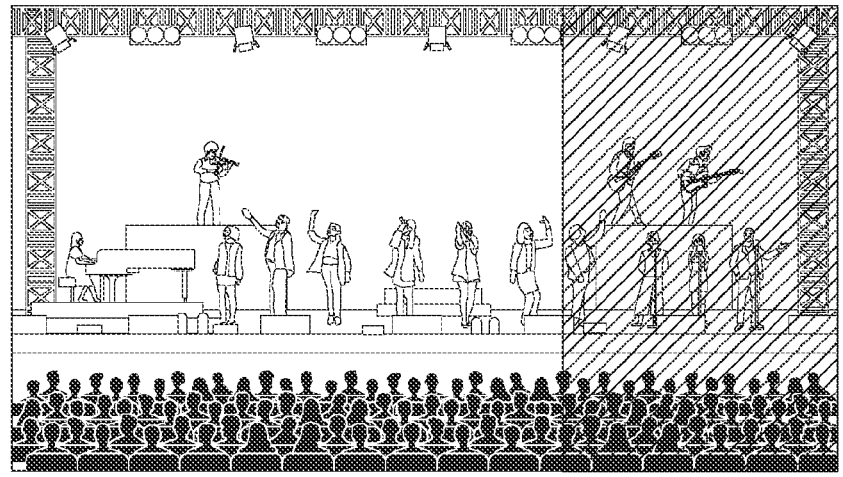
C
RIGHT

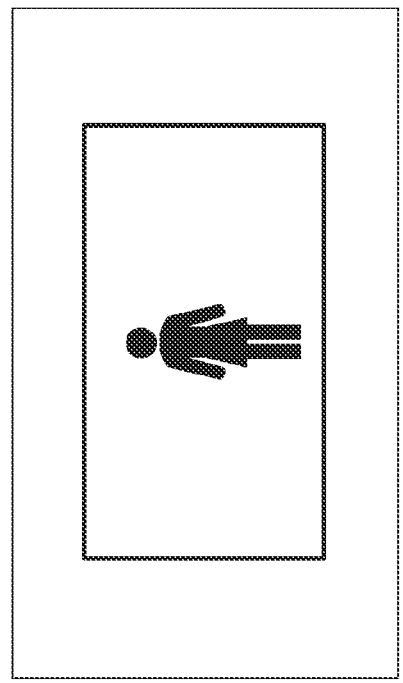
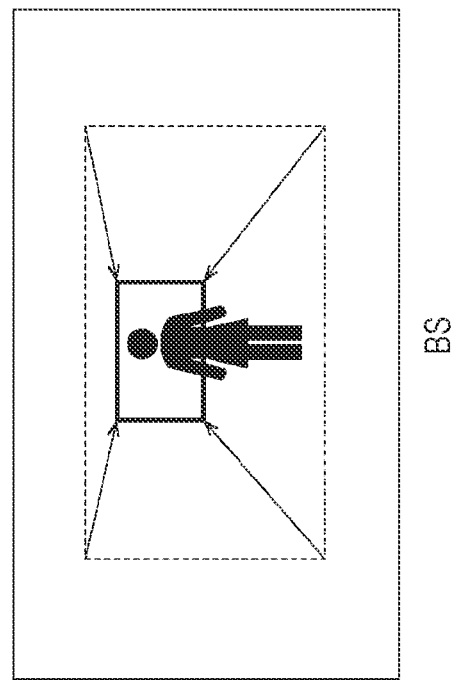
FIG. 11

FIG. 22
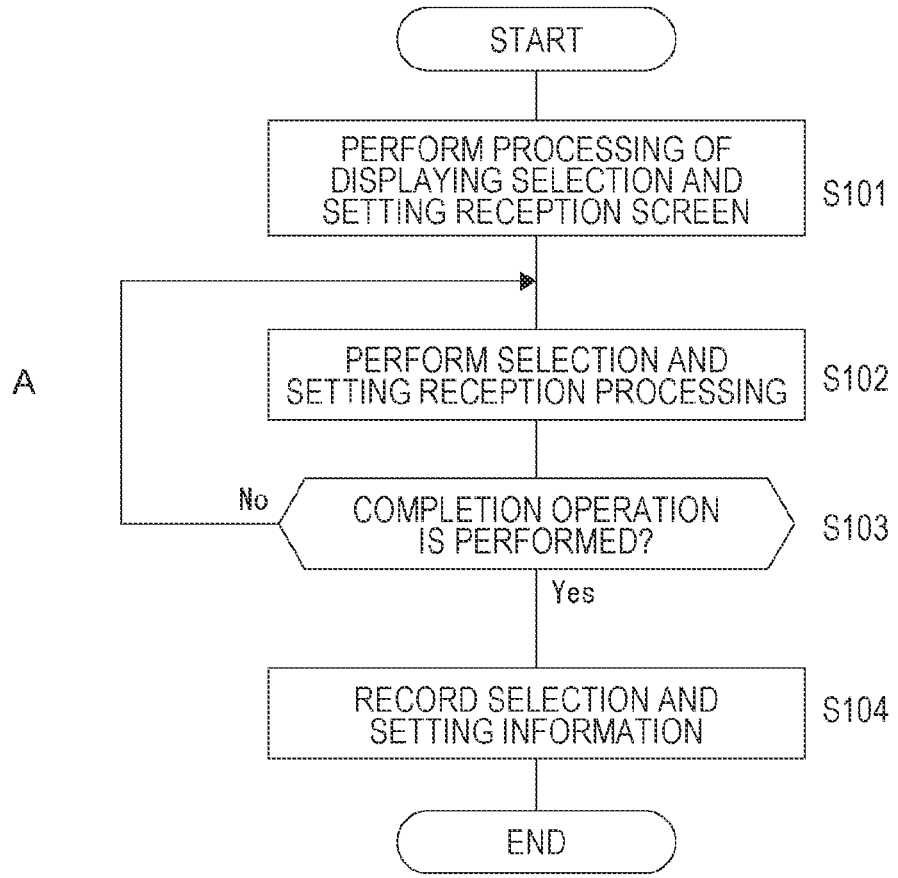
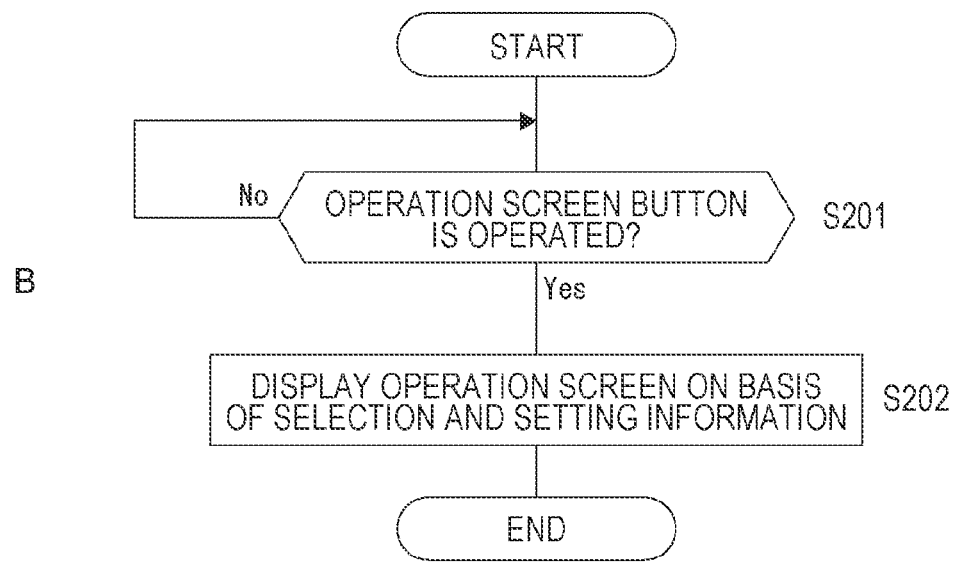

FIG. 27

| SET NAME | Bs GUITAR SOLO | Bs DRUM SOLO | Bs NORMAL | | | | | |
|---|---|---|---|---|---|---|---|---|
| CAMERA | | | | CAM1 | CAM2 | CAM3 | CAM4 | CAM5 | CAM6 | CAM7 |
| RENDERING | | | | AUTOMATIC GRADUAL ZOOM / WIDE-SIDE FIXING / TELEPHOTO-SIDE FIXING | GRADUAL ZOOM IN / WIDE-SIDE FIXING | GRADUAL ZOOM OUT / TELEPHOTO-SIDE FIXING | GRADUAL ZOOM IN / WIDE-SIDE FIXING | AUTOMATIC GRADUAL ZOOM | WIDE-SIDE FIXING / HAND-HELD FEELING | HAND-HELD FEELING |
| TARGET | | | | | | | VOCAL / BASS | VOCAL | GUITAR | Preset WIDE / Preset CENTER |
| IMAGE-CAPTURE TARGET RANGE | | | | | | | UP / WS | UP / WS | RIGHT / WS | WIDE |

(Table reconstruction of FIG. 27 showing columns CAM1–CAM7 under group GmA, with set-name buttons Bs: GUITAR SOLO, DRUM SOLO, NORMAL; Pm indicator; Bm markers.)

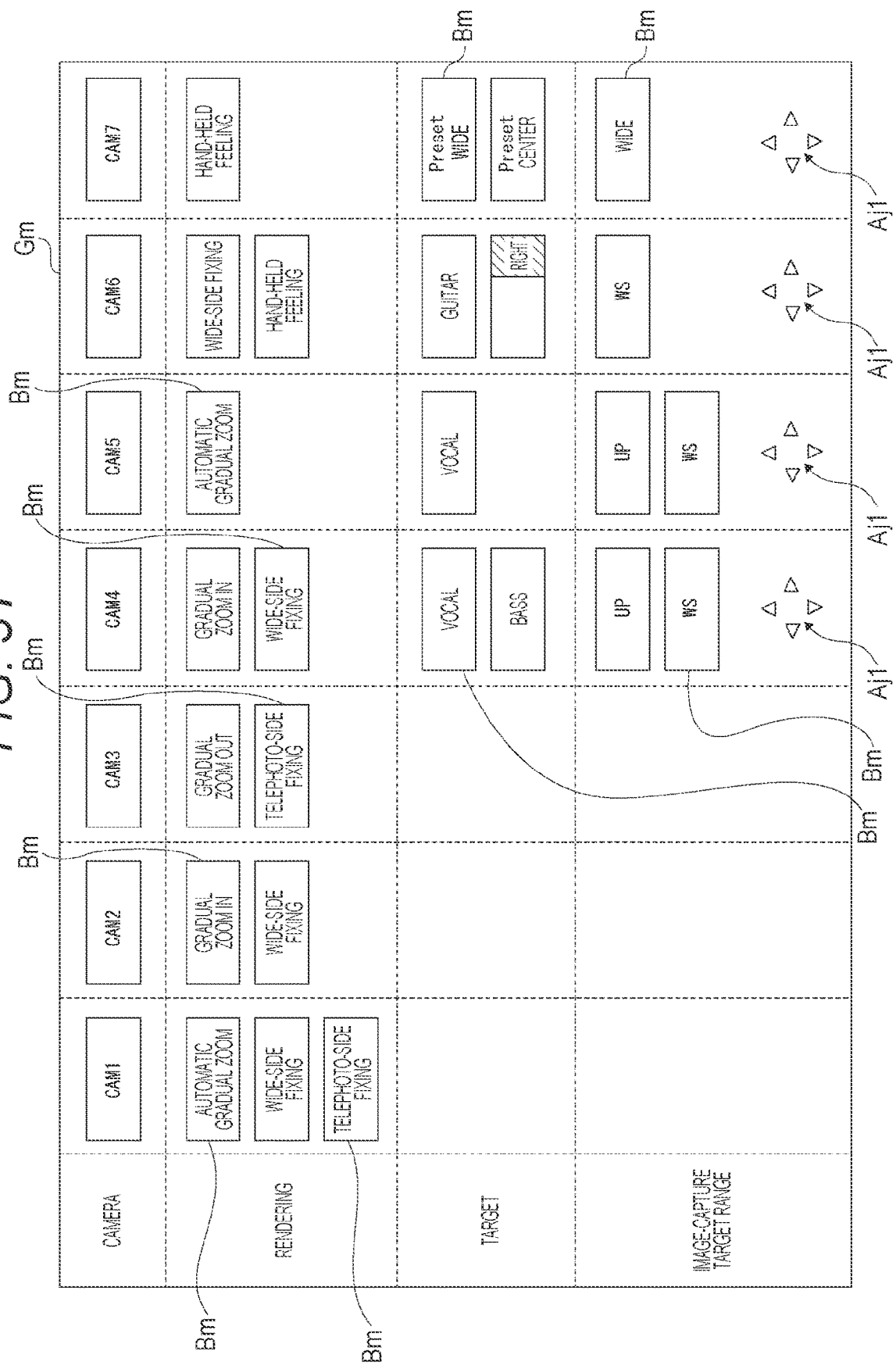

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2021/018046 (filed on May 12, 2021) under 35 U.S.C. § 371, which claims priority to Japanese Patent Application No. 2020-181260 (filed on Oct. 29, 2020), which are all hereby incorporated by reference in their entirety.

TECHNICAL FIELD

The present technology relates to an information processing device, a method thereof, and a program, and particularly relates to an image-capture control technique.

BACKGROUND ART

As control regarding image-capture, for example, it is conceivable that the orientation of a camera may be controlled so as to track a detected subject (that is, subject tracking control) or the zoom of the camera may be controlled so as to make the angle of view coincident with a preset angle of view.

The following Patent Document 1 discloses a technique of controlling the orientation of a camera so as to capture an image of a target. Specifically, Patent Document 1 discloses a technique of detecting a subject position on the basis of a captured image, detecting the subject position using a radio tag held by the subject, and controlling the orientation of the camera on the basis of the two detection results.

CITATION LIST

Patent Document

Patent Document 1: Japanese Patent Application Laid-Open No. 2008-288745

SUMMARY OF THE INVENTION

Problems to be Solved by the Invention

Here, under the image-capture control in the related art, for example, there is a tendency to emphasize an improvement in control accuracy such as more accurate tracking of a target subject, but, for example, in a case where content such as a music live show that requires an immersive feeling (realistic feeling) is the image-capture target, only the improvement in control accuracy is possibly insufficient.

The present technology has been made in view of the above-described circumstances, and it is therefore an object of the present technology to enhance an immersive feeling for a captured image.

Solutions to Problems

An information processing device according to the present technology includes a control unit configured to perform image-capture control on the basis of image-capture rendering information indicating a change in captured image and image-capture target information indicating an image-capture target.

The term "image-capture" used herein means an operation for obtaining an image using a camera, the "camera" being defined as both a real camera and a virtual camera that virtually changes composition by clipping a part of an image obtained as a result of a light-receiving operation of the real camera. With the above-described configuration, it is possible to perform, as the image-capture control, control with consideration given to rendering.

The above-described information processing device according to the present technology may have a configuration where the image-capture target information includes information indicating a person being the image-capture target.

With this configuration, it is possible to perform the image-capture control for a person.

The above-described information processing device according to the present technology may have a configuration where the person being the image-capture target is a person selected from among candidates.

With this configuration, it is possible to perform the image-capture control for a specific person (for example, a person having a specific role such as a guitar player or a bass player, a specific individual among persons having the same role, or the like) among persons who can be the image-capture target, such as a specific performer in a music live show.

The above-described information processing device according to the present technology may have a configuration where the person being the image-capture target is a person recognized in a designated area of an image-capture target space.

With this configuration, it is possible for the user to perform, by designating the area from the image-capture target space without selecting a target person, the image-capture control for the person recognized in the designated area.

The above-described information processing device according to the present technology may have a configuration where the image-capture target information includes information indicating a position in an image-capture target space.

For example, there is a case where it is desired that the image-capture control target is not a specific object but a specific position in the image-capture target space.

The above-described information processing device according to the present technology may have a configuration where the image-capture target information includes information indicating an image-capture target range pertaining the person being the image-capture target.

It is possible to designate a range as to which part of the person being the image-capture target is contained in the captured image.

The above-described information processing device according to the present technology may have a configuration where the information indicating the image-capture target range corresponds to information indicating a range in which an image of an instrument is captured in a case where the instrument is in use by the person being the image-capture target.

With this configuration, it is possible to obtain a captured image focusing on the instrument that is in use by the person being the image-capture target, for example, to obtain a captured image in which a guitar in use by a guitar player is zoomed in on.

The above-described information processing device according to the present technology may have a configuration where the image-capture control includes at least any one of pan control, tilt control, or zoom control for the real camera.

With this configuration, it is possible to perform control to change the image-capture direction of the real camera or change the angle of view of the captured image as the image-capture control based on the image-capture rendering information and the image-capture target information.

The above-described information processing device according to the present technology may have a configuration where the image-capture control includes image-clipping control for an image captured by the real camera.

With this configuration, it is possible to perform control to change the composition of the image captured by the virtual camera as the image-capture control based on the image-capture rendering information and the image-capture target information.

The above-described information processing device according to the present technology may have a configuration where the image-capture rendering information includes rendering information regarding zoom.

With this configuration, it is possible to achieve a rendering using a zoom function, for example, to achieve a change in captured image in which the target subject is gradually zoomed in on.

The above-described information processing device according to the present technology may have a configuration where the image-capture rendering information corresponds to information including at least any one of a zoom speed, a zoom start angle of view, or a zoom end angle of view.

With this configuration, it is possible to designate at least any one of the zoom speed, the zoom start angle of view, or the zoom end angle of view for an effect of the rendering using the zoom function.

The above-described information processing device according to the present technology may have a configuration where the image-capture rendering information includes rendering information regarding camera shake.

With this configuration, it is possible to achieve a rendering as if the image is captured by a hand-held camera.

The above-described information processing device according to the present technology may have a configuration where the image-capture rendering information includes rendering information regarding focus.

With this configuration, it is possible to achieve a rendering using a focus function, for example, to achieve a change in the captured image in which a focus state of the target subject gradually changes from an out-of-focus state to an in-focus state.

The above-described information processing device according to the present technology may further include a selection reception unit configured to receive selection of information to be applied to the image-capture control from among a plurality of types of information for at least any one of the image-capture rendering information or the image-capture target information, in which the selection reception unit may be configured to perform display control of a selection reception screen for receiving selection of the information to be applied.

It is possible to select the information to be applied to the image-capture control from among the plurality of types of information for at least any one of the image-capture rendering information or the image-capture target information, so that it is possible to achieve image-capture control suitable for the image-capture target.

The above-described information processing device according to the present technology may have a configuration where a plurality of cameras to be subject to the image-capture control is provided, and the selection reception unit performs, as the display control of the selection reception screen, display control of a screen capable of receiving the selection for each of the cameras.

The term "camera" herein refers to a concept including both the real camera and the virtual camera that virtually changes the composition by clipping a part of an image obtained as a result of a light-receiving operation of the real camera. With the above-described configuration, it is possible to receive the selection of the image-capture rendering information and the image-capture target information for each camera.

The above-described information processing device according to the present technology may further include an operation screen display control unit configured to perform, as the image-capture control, display control of an operation panel on which an execution instruction operation element of control based on the image-capture rendering information or the image-capture target information selected on the selection reception screen is deployed, in which
  the selection reception unit may be capable of receiving a plurality of sets of the selection for each of the cameras, and
  the operation screen display control unit may be configured to perform control to display the operation panel for each of the sets.

This configuration allows the user to set in advance the execution instruction operation element to be deployed on the operation panel for each predetermined type such as the type of the image-capture purpose or the type of the image-capture target scene and display the operation panel corresponding to the type of the purpose on the screen at the time of operation.

The above-described information processing device according to the present technology may function as a part of an image processing system capable of switching an output image among images captured by a plurality of cameras, in which
  the control unit may be configured to perform, on the basis of control information regarding the switching of the output image, the image-capture control based on the image-capture rendering information.

It is conceivable that the image processing system that switches the output image among the images captured by the plurality of cameras may employ a configuration where a list of images captured by the plurality of cameras is displayed so as to make the output image selectable from the list of captured images, but in this case, for example, it may be difficult to check the image if rendering or the like that gives a blur in order to give a hand-held feeling is applied. If the control pertaining to the image-capture rendering is performed on the basis of the control information regarding the switching of the output image as described above, it is possible to prevent the control pertaining to the image-capture rendering from being performed on the captured image (image in the non-output state) that is not selected as the output image.

It is therefore possible to improve the ease of the image check at the time of selecting the output image.

The above-described information processing device according to the present technology may have a configuration where the control unit starts, in response to selection of the output image or a next output candidate image from among the images captured by the plurality of cameras, the control for an image-capture source camera of the selected captured image.

With this configuration, the image-capture control for the image-capture source camera of the captured image is started at the timing when the captured image is estimated to be the output image.

Furthermore, an information processing method according to the present technology includes causing an information processing device to perform image-capture control on the basis of image-capture rendering information indicating a change in captured image and image-capture target information indicating an image-capture target.

With such an information processing method, it is also possible to obtain functions similar to the functions of the above-described information processing device according to the present technology.

Moreover, a program according to the present technology is readable by a computer device, the program causing the computer device to implement a function of performing image-capture control on the basis of image-capture rendering information indicating a change in captured image and image-capture target information indicating an image-capture target.

With such a program, the above-described information processing device according to the present technology is implemented.

BRIEF DESCRIPTION OF DRAWINGS

FIG. 5 is a diagram illustrating an example of a change in composition in a case where a new subject is detected in the captured image.

FIG. 9 is a diagram illustrating examples of a type of an image-capture target range in the embodiment.

FIG. 10 is a diagram illustrating examples of a zone setting in "zoning setting".

FIG. 11 is a diagram illustrating an example of a change in composition.

FIG. 22 is a flowchart illustrating processing pertaining to the display of the selection and setting reception screen or the operation screen.

FIG. 27 is a diagram illustrating an example of an operation screen adapted to the set setting.

FIG. 31 is an explanatory diagram of a fourth modification.

MODE FOR CARRYING OUT THE INVENTION

Hereinafter, an embodiment according to the present technology will be described in the following order with reference to the accompanying drawings.

<1. Image processing system as embodiment>
<2. Hardware configuration of information processing device>
<3. Various composition control>
(3-1. Example of operation screen)
(3-2. Details of various composition control in embodiment)
(3-3. GUI for selection of button to be deployed and setting of control information)
(3-4. Functional block)
<4. Processing procedure>
<5. Modification>
(5-1. First modification)
(5-2. Second modification)
(5-3. Third modification)
(5-4. Fourth modification)
(5-5. Other modifications)
<6. Program>
<7. Summary of embodiment>
<8. Present technology>

1. Image Processing System as Embodiment

Figure 1:
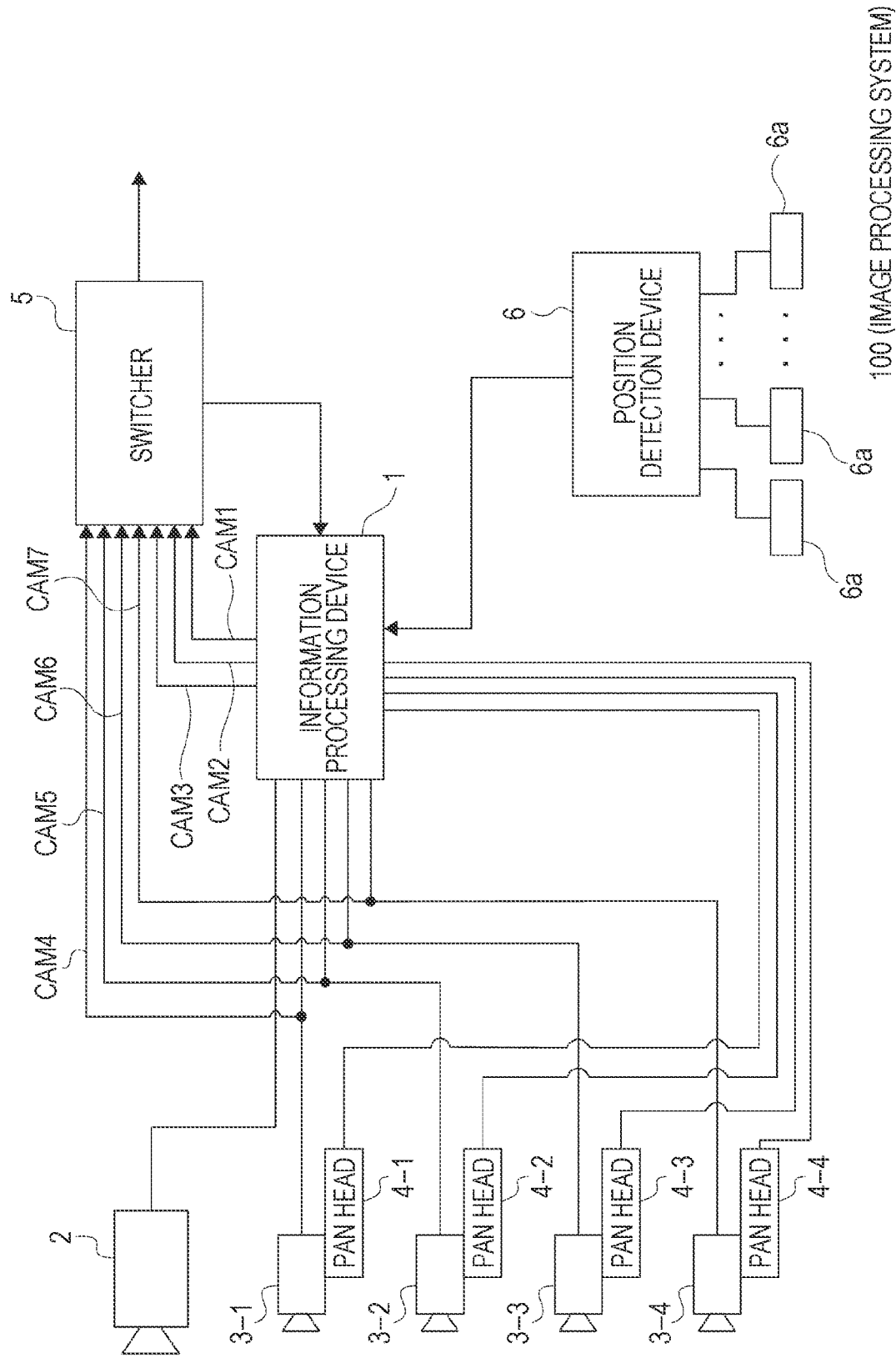
FIG. 1 is a diagram illustrating a configuration example of an image processing system including an information processing device as an embodiment according to the present technology.

FIG. 1 illustrates a configuration example of an image processing system 100 including an information processing device 1 as an embodiment according to the present technology.

As illustrated in the drawing, the image processing system 100 includes the information processing device 1, a master camera 2, a slave camera 3, a pan head 4, a switcher 5, and a position detection device 6.

In the present example, a single master camera 2 and a plurality of slave cameras 3, specifically, four slave cameras 3 are used. In a case of making a distinction among the four slave cameras 3, a "- (hyphen)" and a digit are appended to each reference numeral as illustrated in the drawing, and the reference numerals are denoted as "3-1", "3-2", "3-3", and "3-4".

The master camera 2 and the slave cameras 3 are each configured as an image-capture device that includes an image-capture element such as a charge coupled device (CCD) image sensor or a complementary metal oxide semiconductor (CMOS) image sensor and captures an image.

The pan head 4 is configured as an electronic pan head and is capable of supporting a corresponding slave camera 3 and changing the orientation of the slave camera 3 in each of a pan direction and a tilt direction on the basis of a control signal sent from the outside.

In the present example, the pan head 4 is provided for each slave camera 3, and in a case of making a distinction among the four pan heads 4, a "- (hyphen)" and a digit are appended to each reference numeral as illustrated in the drawing, and the reference numerals are denoted as "4-1", "4-2", "4-3", and "4-4".

In the image processing system 100, an image of an object is captured from a plurality of viewpoints by the plurality of cameras including the master camera 2 and the slave cameras 3, and images of a plurality of systems obtained on the basis of the image capture are input to the switcher 5.

The switcher 5 selects the image of one system from among the images of the plurality of systems thus input and outputs the image of the one system on the basis of operation.

The image output by the switcher 5 can be distributed over a network such as the Internet or can be transmitted over a broadcast wave, for example. Alternatively, the image can be recorded (stored) as image content in a predetermined recording medium.

In the present example, the image-capture target of the cameras includes a music live event, and the master camera 2 and the slave cameras 3 are installed in a live venue.

Figure 2:
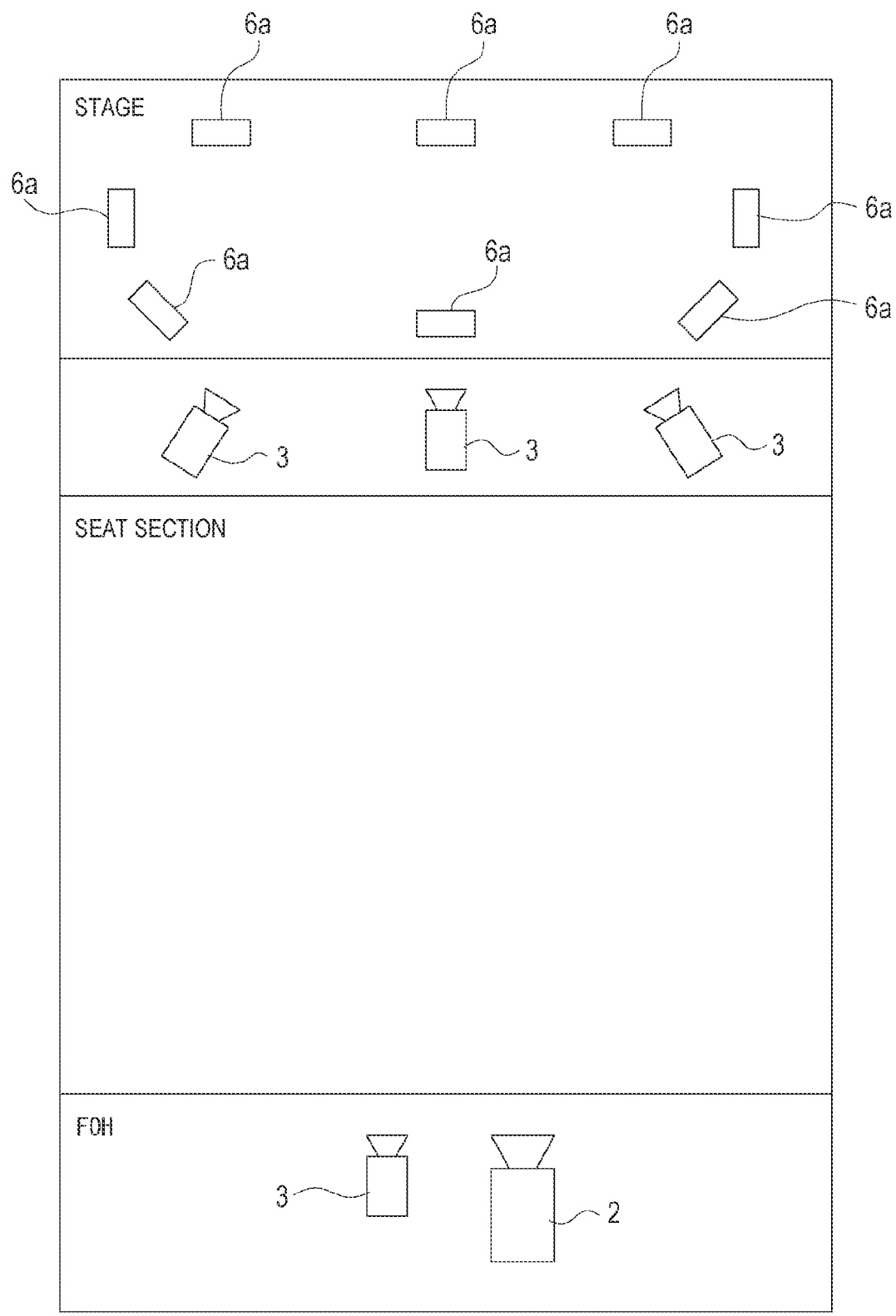
FIG. 2 is an image diagram of a live venue assumed in the embodiment.

FIG. 2 is an image diagram of a live venue assumed in the embodiment.

As illustrated in the drawing, the live venue is provided with a stage, a seat section, and front of house (FOH). On the stage, a performer such as a player or a singer gives a performance.

The seat section is a space located behind the stage and capable of accommodating audiences.

The FOH is a space located behind the seat section, in which various equipment for controlling elements pertaining to the direction of the live performance such as lighting, and persons belonging to a live event organizer such as a director and staff members are deployed.

In the present example, the master camera 2 is a camera for capturing the entire stage within the angle of view, and is deployed in the FOH. In the present example, the image captured by the master camera 2 has resolution of 4 K (3840*1080) while the image output by the switcher 5 has resolution of full high definition (FHD: 1920*2160). Furthermore, in the present example, a camera without an optical zoom is used as the master camera 2.

Furthermore, three of the slave cameras 3 are deployed in a space between the stage and the seat section (so-called a space in front of the front fence), and can capture the performer on the stage within the angle of view at a position closer than the FOH. As illustrated in the drawing, each of the three slave cameras 3 is deployed at a corresponding position that is one of a center, a left end, or a right end in a horizontal direction (direction orthogonal to a front-rear direction).

The remaining one of the slave cameras 3 is deployed in the FOH. This slave camera 3 is used as a camera for capture the performer on the stage by telephotography.

In the present example, a camera including an optical zoom is used as each slave camera 3. Furthermore, in the present example, each slave camera 3 is configured to be able to change output resolution of the captured image. Specifically, the output resolution can be switched between at least 4K and FHD.

As will be described later, the image processing system 100 of the present example controls the orientation of each slave camera 3 so as to track a subject such as a performer on the stage. The image processing system 100 is therefore provided with the position detection device 6 illustrated in FIG. 1.

The position detection device 6 is configured as a device for detecting the position of a radio tag, and includes a plurality of receivers 6a that receive radio waves transmitted from the radio tag. In the present example, the position detection device 6 makes position detection under a method using an ultra wide band (UWB). Attaching the radio tag to a subject that can be an object to be tracked allows the position of the subject to be detected.

In the present example, the subject to be tracked is a performer on the stage, and in this case, the plurality of receivers 6a is arranged on an outer periphery of the stage so as to surround an activity area of the performer (an area including a center of the stage) as illustrated in FIG. 2.

Note that the method for detecting the position of the subject is not limited to the method using the ultra wide band (UWB), and may include various methods. For example, a method using a wireless local area network (LAN), specifically, a method under which a plurality of wireless LAN access points is provided, and the position is detected on the basis of a difference in arrival time of radio waves between the access points, a method under which the position is detected using a result of three-dimensional measurement made by a time of flight (ToF) sensor, and the like can be given as examples.

Here, as illustrated in FIG. 1, the image processing system 100 of the present example inputs images of a total of seven systems, CAMs 1 to 7, to the switcher 5.

As the images of the CAMs 4 to 7, images captured by the four slave cameras 3 are input to the switcher 5. The images of the CAM 1 to the CAM 3 are generated by the information processing device 1 serving as a computer device on the basis of the image captured by the master camera 2.

Figure 3:
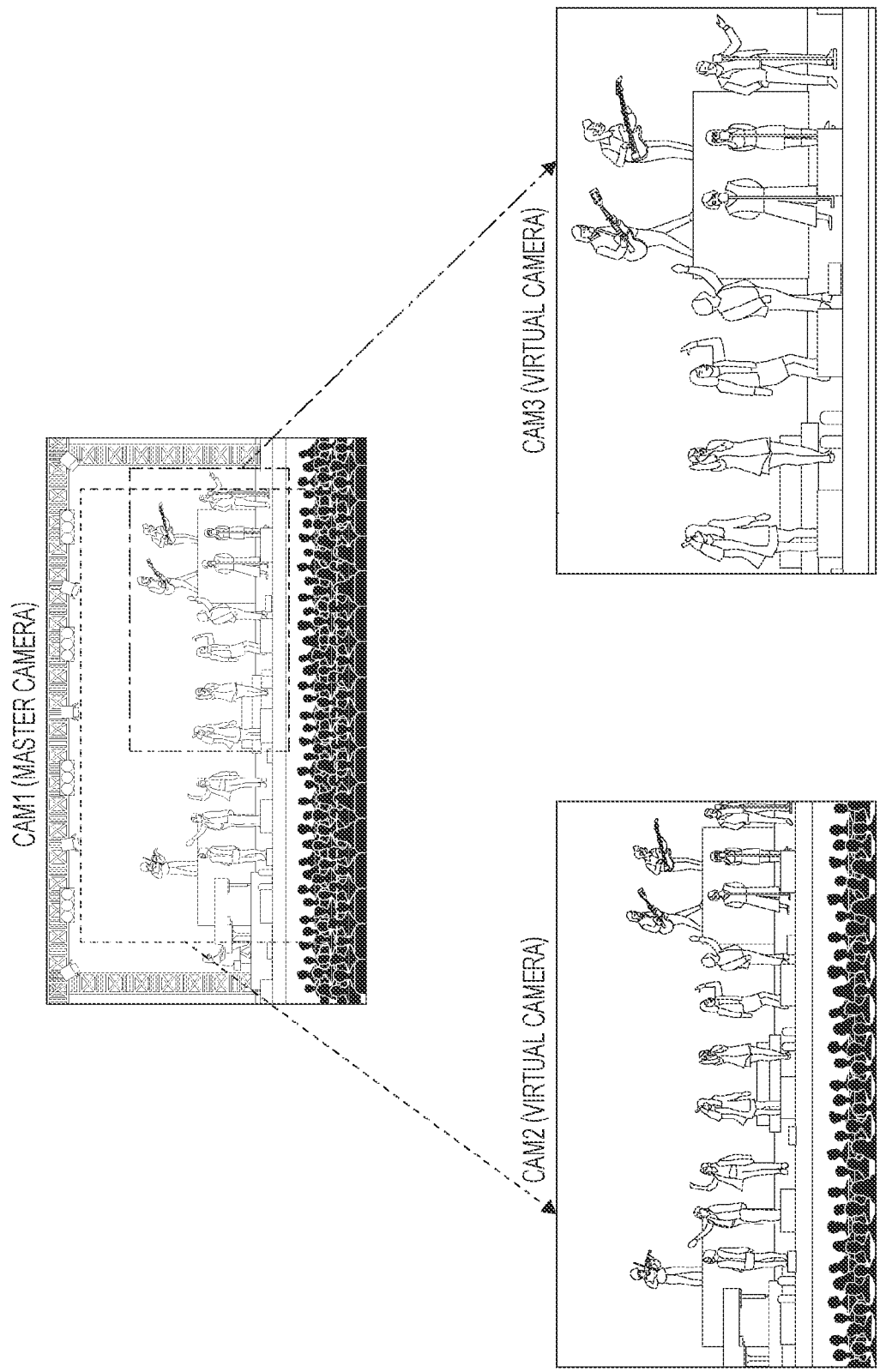
FIG. 3 is a diagram illustrating how an image captured by a virtual camera is shown.

FIG. 3 illustrates the images of the CAM 1 to the CAM 3.

In principle, as the image of the CAM 1, the image captured by the master camera 2 is output as it is. That is, an image having an angle of view based on the angle of view of the image captured by the master camera 2 is output. Note that, in a case where a "gradual zoom" function to be described later is enabled, electronic zoom processing (that is, image clipping processing) is performed on the image captured by the master camera 2, and an image having an angle of view narrower than the angle of view of the image captured by the master camera 2 is output.

Each of the images of the CAM 2 and the CAM 3 is an image clipped from the image captured by the master camera 2. For the images of the CAM 2 and CAM 3, not only an image clipping size but also a clipping position can be adjusted.

Here, changing the clipping position of the captured image corresponds to virtually changing the positional relation between the camera and the subject, and changing the clipping size of the captured image corresponds to virtually changing the magnification of the optical zoom. That is, it can be said that obtaining an image by changing the clipping position and clipping size of the captured image corresponds to changing composition by moving or operating an imaginary camera (virtual camera).

Herein, the term "camera" is used as a concept including both such a virtual camera and a real camera such as the master camera 2 or the slave camera 3. In other words, the term "camera" herein refers to a concept including both a real camera and a virtual camera that virtually changes the composition by clipping a part of an image obtained as a result of a light-receiving operation of the real camera.

In the present example, the CAM 1 is regarded as belonging to the virtual camera because the CAM 1 may be subject to "gradual zoom" function to be described later and be subject to clipping of the captured image.

Furthermore, the term "image-capture" is used herein, and "image-capture" means, when both the real camera and the virtual camera are each defined as a "camera" as described above, an operation of obtaining an image with the camera.

Note that, in the following description, the image clipping may be referred to as "cutout".

In the present example, as the image of the CAM 2, an image containing all subjects as performers detected in the image captured by the master camera 2 is generated.

Figure 4:
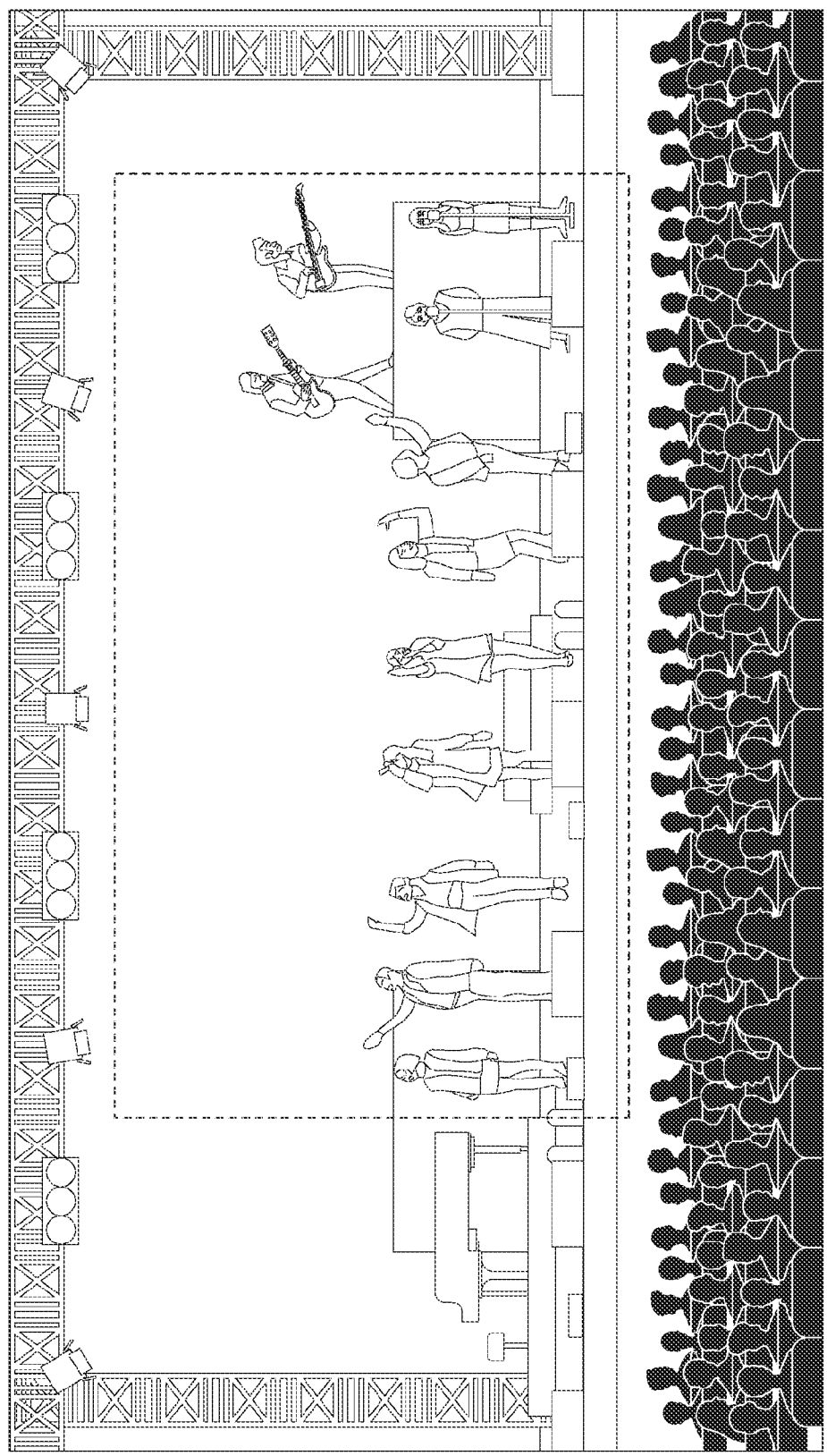
FIG. 4 is a diagram illustrating a specific example of an image containing all subjects.

FIG. 4 illustrates a specific example.

As in a range indicated by a dashed line in the drawing, an image having composition containing, in the angle of view, all the subjects as performers detected in the image captured by the master camera 2 is generated as the image of the CAM 2.

Here, for the image of the CAM 2, the composition containing all the subjects is adaptively changed according to the number or positions of the subjects detected in the image (image having resolution of 4K in the present example) captured by the master camera 2. That is, when a new subject is detected in the image captured by the master camera 2, composition further containing the subject is determined, and in a case where the number of detected subjects decreases, composition is determined on the basis of the positions of the remaining subjects.

FIG. 5 illustrates an example of a change in composition in a case where a new subject is detected in the captured image. In a case where a subject is newly detected as illustrated in the drawing, composition is changed to composition further containing the newly detected subject.

Furthermore, for the image of the CAM 2, in a case where a subject on the stage is lost due to blown-out highlights, blocked-up shadows, sudden flickering, or the like, the current composition is maintained for a predetermined time.

Furthermore, for the image of the CAM 2, the rate of change in composition is determined in accordance with the rate of change in composition designated as a common setting to be described later.

Here, the output resolution of the image of the CAM 2 is the FHD resolution the same as the resolution of the image output by the switcher 5. In a case of composition containing all the subjects, a size of an area clipped from the captured image (4K resolution image) may be larger than the FHD size, and in this case, the clipped image is output with the resolution of the clipped image converted to the FHD resolution.

Moreover, for the image of the CAM 2, when no subject is detected on the stage, an image area of the FHD size having the same center as the image captured by the master camera 2 is clipped.

Furthermore, in a case where the image size of the composition containing all the subjects becomes smaller than the FHD size due to that there are only a few number of subjects present on the stage, subjects are densely packed together in one place, or the like, an image having the FHD size based on composition whose center coincides with a center position between subjects at both ends is clipped and output.

At this time, in a case where any one of the left and right ends of the area to be clipped lies off a corresponding one of the left and right ends of the image captured by the master camera 2, an image having the FHD size based on composition aligned with the ends of the image captured by the master camera 2 is clipped.

Furthermore, in the present example, as the image of the CAM 3, for example, an image having an angle of view based on an angle of view narrower than the angle of view of the image captured by the master camera 2 is generated by clipping and output. The image of the CAM 3 is clipped as an image whose center coincides with the center of the image captured by the master camera 2.

Here, the information processing device 1 illustrated in FIG. 1 generates the images of the CAM 1 to the CAM 3 as described above on the basis of the image captured by the master camera 2 and performs composition control for the images captured by the slave cameras 3 as the real cameras. Specifically, the composition control is performed on the images captured by the slave cameras 3 by panning and tilting the pan heads 4 and controlling the zoom of the slave cameras 3 on the basis of operation input.

Note that details of the composition control as an embodiment will be described later again.

2. Hardware Configuration of Information Processing Device

Figure 6:
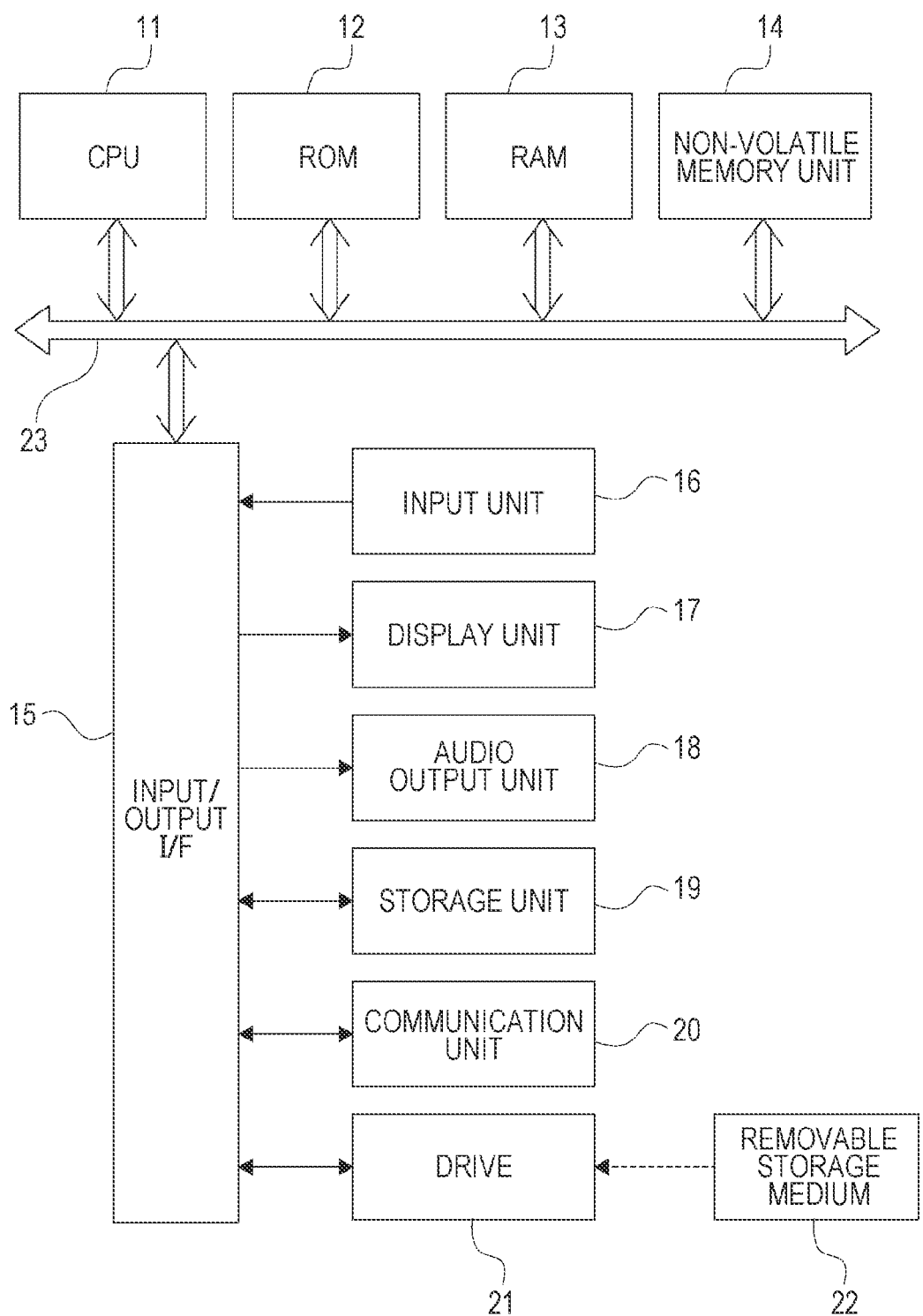
FIG. 6 is a block diagram illustrating a hardware configuration example of the information processing device as the embodiment.

FIG. 6 is a block diagram illustrating a hardware configuration example of the information processing device 1.

Examples of a device type of the information processing device 1 include a personal computer, a tablet terminal, a smartphone, and the like.

In FIG. 6, a CPU 11 of the information processing device 1 performs various processing in accordance with a program stored in a non-volatile memory unit 14 such as a ROM 12 or an electrically erasable programmable read-only memory (EEP-ROM), or a program loaded from a storage unit 19 into a RAM 13. The RAM 13 further stores, as needed, data and the like necessary for the CPU 11 to perform various processing.

The CPU 11, the ROM 12, the RAM 13, and the non-volatile memory unit 14 are connected to each other over a bus 23. An input/output interface 15 is also connected to the bus 23.

An input unit 16 including an operation element or an operation device is connected to the input/output interface 15.

For example, it is conceivable that there are various operation elements and operation devices such as a keyboard, a mouse, a key, a dial, a touchscreen, a touchpad, and a remote controller as the input unit 16.

A user operation is detected by the input unit 16, and a signal corresponding to the input operation is interpreted by the CPU 11.

Furthermore, a display unit 17 including a liquid crystal display (LCD), an organic electro-luminescence (EL) panel, or the like, and an audio output unit 18 including a speaker or the like are integrally or separately connected to the input/output interface 15.

The display unit 17 is a display unit that outputs various displays, and includes, for example, a display device provided in a housing of the information processing device 1, a separate display device connected to the information processing device 1, or the like.

The display unit 17 displays an image to be subjected to various types of image processing, a moving image to be processed, or the like on a display screen on the basis of an instruction from the CPU 11. Furthermore, the display unit 17 displays various operation menus, icons, messages, and the like, that is, a display as a graphical user interface (GUI), on the basis of an instruction from the CPU 11.

There is a case where the storage unit 19 including a hard disk, a solid-state memory, or the like, and a communication unit 20 including a modem or the like are further connected to the input/output interface 15.

The communication unit 20 performs communication processing over a transmission path such as the Internet and performs wired/wireless communications, bus communications, or the like with various devices.

A drive 21 is also connected to the input/output interface 15 as needed, and a removable storage medium 22 such as a magnetic disk, an optical disc, a magneto-optical disk, or a semiconductor memory is attached as needed.

The drive 21 allows a data file such as an image file, various computer programs, and the like to be read from the removable storage medium 22. The read data file is stored in the storage unit 19, and an image and a sound included in the data file are output by the display unit 17 and the audio output unit 18. Furthermore, a computer program and the like read from the removable storage medium 22 are installed in the storage unit 19 as needed.

In the information processing device 1, software can be installed via network communications by the communication unit 20 or via the removable storage medium 22. Alternatively, the software may be prestored in the ROM 12, the storage unit 19, or the like.

3. Various Composition Control (3-1. Example of Operation Screen)

Figure 7:
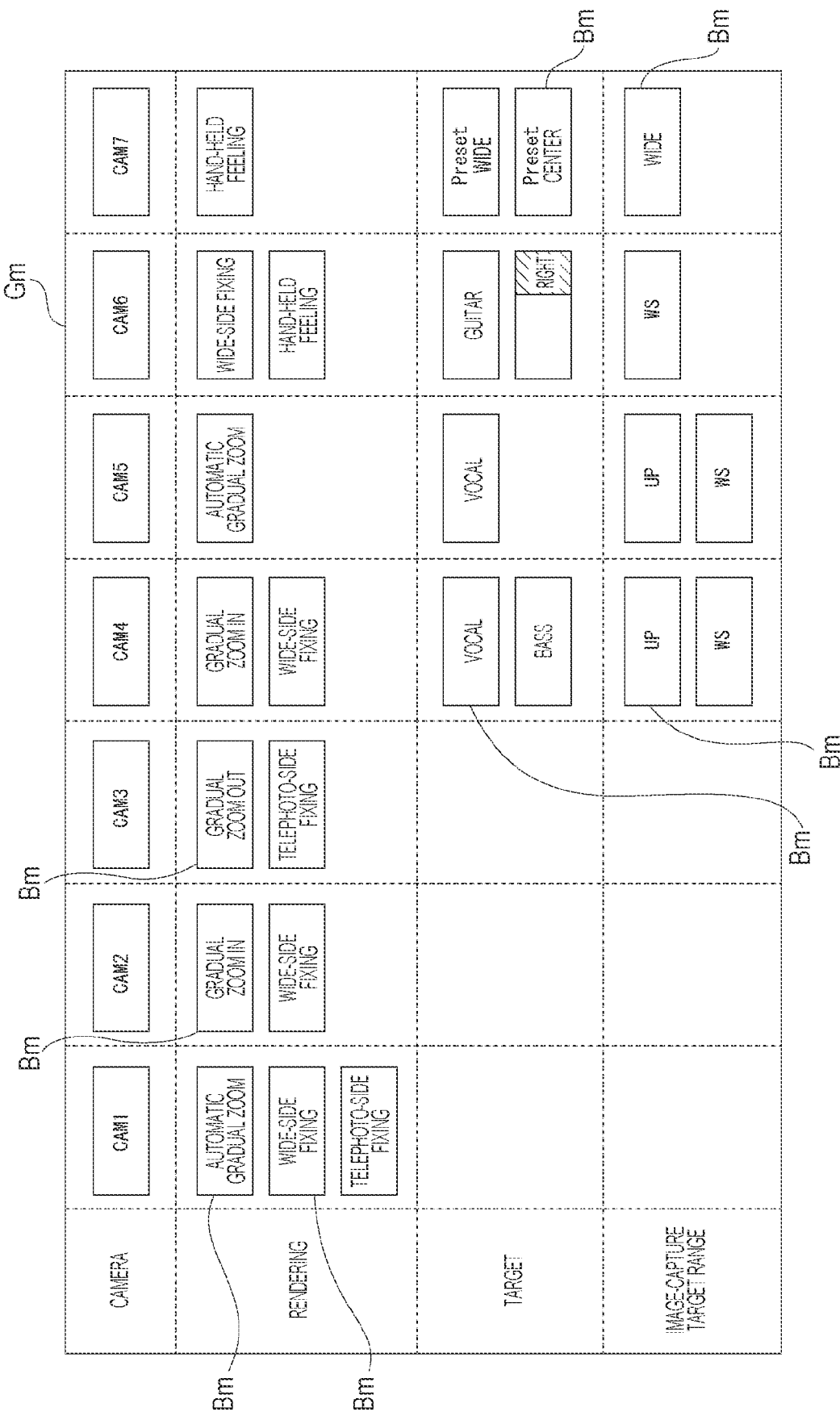
FIG. 7 is a diagram illustrating an example of an operation screen as an embodiment.

FIG. 7 is a diagram illustrating an example of an operation screen Gm as an embodiment for use in composition control for each camera.

In the present example, the operation screen Gm is a screen displayed by the display unit 17 of the information processing device 1, and as illustrated in the drawing, an execution instruction button Bm for giving an instruction to perform composition control is deployed for each camera of the CAM 1 to the CAM 7. A user such as a director can instruct, by operating the execution instruction button Bm displayed for a certain camera, the information processing device 1 to perform composition control in a mode set to be associated with the operated execution instruction button Bm for the camera.

In the present example, three options of "rendering", "target", and "image-capture target range" are defined as options pertaining to composition control.

The composition control of "rendering" is composition control based on image-capture rendering information. The image-capture rendering information can also be referred to as information indicating a change in captured image, and is specifically information indicating a visual rendering mode pertaining to the captured image.

Examples of the composition control pertaining to "rendering" include control of "gradual zoom" (a technique of gradually zooming, which is often used as an image-capture technique applied to a music live show) and "hand-held feeling" (an effect as if an image is captured by a hand-held camera) to be described later.

"Target" is an option pertaining to the designation of a subject being the image-capture target. Operating the execution instruction button Bm belonging to the option "target" causes control to be performed so as to achieve composition containing a subject corresponding to the execution instruction button Bm in the captured image.

In the present example, the composition control of "target" includes control using a result of detecting the position of the subject and control not using the result of detecting the position of the subject. Examples of the composition control using the result of detecting the position of the subject include subject tracking control. In this case, a subject to be tracked is associated with the execution instruction button Bm, and operating the execution instruction button Bm causes control for achieving composition for tracking the associated subject to be performed. For example, in a case where a performer being the image-capture target is a member of a rock band, the execution instruction button Bm of "target" can be associated with, for example, a performer as "vocal" or a performer as "guitar", and the user can give, by operating the execution instruction button Bm, an instruction to perform control for achieving composition for tracking the performer such as "vocal" or "guitar".

Furthermore, examples of the composition control not using the result of detecting the position of the subject include control according to "Preset position" to be described later. As will be described later, "Preset position" is a function that can preset a specific position in the image-capture target space as the position of the image-capture target, and the user can give, by operating the execution instruction button Bm of "Preset position", an instruction to perform control for achieving composition containing the preset specific position in the captured image (for example, composition making the specific position coincident with a predetermined position such as the center of the captured image).

Note that, as understood from the above description, under the composition control of the present embodiment, a possible object (target) to be subject to image-capture is not only a specific person but also a specific position.

Here, in the example in FIG. 7, the execution instruction button Bm for "target" is not deployed for the virtual cameras of the CAM 1 to the CAM 3, and this is because the user is not permitted to make the designation of the target for the captured images of the CAM 1 to the CAM 3 in the present example.

Note that the user is not permitted to make the designation of the target, but information regarding the designation of the target itself exists. Specifically, for the CAM 1, when the composition control of "gradual zoom" to be described later is performed, electronic zoom processing (clipping processing) is performed on the image captured by the master camera 2, and at this time, the center of the clipped image coincides with the center of the image captured by the master camera 2. This can be also said that, as composition control (clipping processing), control is performed with the center position of the image captured by the master camera 2 as the image-capture target.

Furthermore, as described above, in a case of the present example, the captured image of the CAM 3 is clipped as an image whose center coincides with the center of the image captured by the master camera 2, but it can be said that such clipping control is control under which the center position of the image captured by the master camera 2 is regarded as the image-capture target.

Moreover, the captured image of the CAM 2 is generated as an image containing all subjects as performers detected in the image captured by the master camera 2 (see FIG. 4), but in this case, the image-capture target is determined as "all subjects as performers detected in the image captured by the master camera 2".

As described above, for the virtual cameras of the CAM 1 to the CAM 3, the information regarding the designation of the target is also used for image-capture control (composition control).

Note that it is merely an example that the user is not permitted to designate the target for the captured images of the CAM 1 to the CAM 3, and it is needless to say that the execution instruction button Bm of "target" can be deployed for the CAM 1 to the CAM 3 to permit the user to designate the target.

Furthermore, in FIG. 7, "image-capture target range" is an option pertaining to the designation of a range as to which part of a person being the image-capture target is contained in the captured image. For example, "WS (waist shot)", "UP (up shot)", and the like to be described later can be given as examples. The user can instruct, by operating the execution instruction button Bm deployed for the option of "image-capture target range", the information processing device 1 to perform control for achieving composition capturing the subject designated using the execution instruction button Bm deployed for the above-described "target" in the image-capture target range corresponding to the operated execution instruction button Bm.

Here, on the operation screen Gm, the execution instruction button Bm whose corresponding composition control is in execution and the execution instruction button Bm whose corresponding composition control is out of execution can be displayed in different display modes, such as highlighting the execution instruction button Bm that has been operated to bring the corresponding composition control into operation.

(3-2. Details of Various Composition Control in Embodiment)

Hereinafter, details of various composition control that can be performed in the embodiment will be described.

"Gradual Zoom"

This is a function of slowly zooming, and in the present example, three types, "gradual zoom in", "gradual zoom out", and "automatic gradual zoom", are prepared as execution instruction buttons Bm.

"Gradual zoom in" and "gradual zoom out" correspond to a function of slowly zooming in (telephoto side) and a function of zooming out (wide side), respectively.

Figure 8:
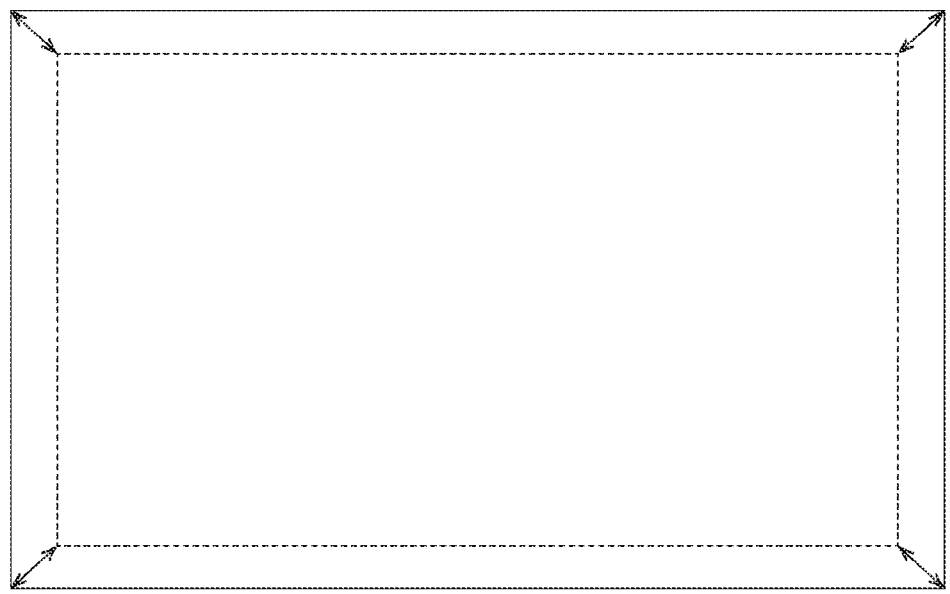
FIG. 8 is a diagram schematically illustrating action of "automatic gradual zoom".

"Automatic gradual zoom" is a function of automatically repeating "gradual zoom in" and "gradual zoom out". FIG. 8 schematically illustrates, as an example, the action of "automatic gradual zoom" of the electronic zoom, and under zoom control of "automatic gradual zoom", zoom control of "gradual zoom in" under which a frame to be clipped is gradually reduced in size from a wide-side frame indicated by a solid line frame in the drawing to a telephoto-side frame indicated by a dashed line frame in the drawing, and zoom control of "gradual zoom out" under which the frame to be clipped is gradually increased in size from the telephoto-side frame to the wide-side frame are repeated.

Note that, in the present example, the initial action of "automatic gradual zoom" starts from the telephoto side (from the wide side when a telephoto-side limit is already reached). At the time of switching between the telephoto side and the wide side, a delay time of about 1 sec may be provided, for example.

In the present example, the user can set a zoom speed and a zoom period for each of "gradual zoom in", "gradual zoom out", and "automatic gradual zoom".

"Zoom Position Fixing"

This is a function of fixing the angle of view, and in the present example, two types, "wide-side fixing" and "telephoto-side fixing", are prepared as execution instruction buttons Bm.

"Wide-side fixing" is a function of moving to a wide-side limit position within a zoom movable range (telephoto side of a preset movable range of gradual zoom) as quickly as possible and holding composition at the position.

"Telephoto-side fixing" is a function of moving to a telephoto-side limit position within the zoom movable range (wide side of the preset movable range of gradual zoom) as quickly as possible and holding composition at the position.

"Preset Position"

This is a function of controlling composition allowing a predetermined position to be contained in the captured image as the Preset position. Here, the composition allowing a certain position to be contained in the captured image means composition capturing the certain position at a predetermined position such as the center position in the captured image.

For the execution instruction button Bm of "Preset position", the user can set button name information.

In a case where the execution instruction button Bm of "Preset position" is operated, composition is changed from the current composition to the composition capturing a preset Preset position. In a case where a plurality of Preset positions can be set, and for example, a telephoto-side Preset position and a wide-side Preset position are set, it is possible to make, by sequentially controlling these positions, a change in composition in which a change from the current composition to composition of the telephoto-side Preset position is made, and then a change to composition of the wide-side Preset position is made.

"Subject Tracking"

This is a function of controlling composition so as to track a preset subject, and is applied only to the slave cameras 3 in the present example.

In the present example, the user can input and set name information such as "vocal", "guitar", and "bass" for the execution instruction button Bm of "subject tracking".

In a case where the execution instruction button Bm of "subject tracking" is operated, composition control for achieving composition for tracking the subject associated with the operated execution instruction button Bm is started.

Here, the composition for tracking the subject means composition continuously capturing the subject at a predetermined position such as the center position in the captured image.

Here, in the present example, the subject tracking is made using both the result of position detection made by the position detection device 6 and the result of subject position detection of image recognition processing on the image captured by the master camera 2. As described later, the subject to be tracked is designated on the basis of an operation of designating the ID of the radio tag.

Furthermore, for action when the execution instruction button Bm of "subject tracking" is operated, a rate of change from the current composition to composition for tracking the target subject conforms to a rate of change information set in "common setting" to be described later.

Moreover, for "subject tracking", in a case where a position detection state of the target subject is poor, the tracking is disabled to cause the composition to slowly change, so that it is possible to prevent the change in composition from becoming unnatural (image from becoming strange).

"Image-Capture Target Range"

This is a function of performing composition control for adjusting a range indicating which part of a person being the image-capture target is contained in the captured image, and is applied only to the slave cameras 3 in the present example.

Examples of a range type of the image-capture target range include "UP (up shot)", "BS (bust shot)", "WS (waist shot)", "FF (full figure)", and "wide" illustrated in FIG. 9.

"UP" corresponds to composition fully containing the face of the subject in the image frame, and "BS" corresponds to composition containing only a part from the chest to the tip of the head of the subject in the image frame. Furthermore, "WS" corresponds to composition containing only a part from the waist to the tip of the head of the subject in the image frame, and "FF" corresponds to composition containing the whole body from the head to the feet of the subject in the image frame. Furthermore, although not illustrated, "wide" corresponds to composition when a zoom lens is moved to a wide end with the subject placed at the center, and this is intended to reproduce composition based on a so-called image-capture using wide lens in front of the front fence.

In a case where the execution instruction button Bm of "image-capture target range" is operated, image-capture control is performed so as to achieve composition based on the range type associated with the operated execution instruction button Bm.

At this time, the rate of change in composition from the current composition conforms to the rate of change in composition set in the common setting to be described later.

Here, for the composition control pertaining to "image-capture target range", in a case where the subject to be tracked is designated according to the operation of the execution instruction button Bm of "subject tracking" described above or the operation of the execution instruction button Bm of "zoning setting" to be described later, control for achieving composition based on the designated range type is performed on the subject to be tracked.

Furthermore, in a case where the subject to be tracked is not designated, and the Preset position to be targeted is designated according to the operation of the execution instruction button Bm of "Preset position" described above, control for achieving composition based on the designated range type is performed on a subject closest to the Preset position.

Moreover, for the composition control pertaining to "image-capture target range", in a case where zooming in (or zooming out) to achieve the composition based on the designated range type cannot be made due to a zoom limit, zooming in (or zooming out) to the limit is made with only the target subject aligned with the center.

"Zoning Setting"

This is a function of tracking a subject recognized in a designated area (zone) in the image-capture target space, and is applied only to the slave cameras 3 in the present example.

FIG. 10 is a diagram illustrating examples of a zone setting.

As illustrated in the drawing, in the present example, the image-capture target space (space on the stage of the live venue in the present example) is divided into three zones, a left zone (FIG. 10A), a center zone (FIG. 10B), and a right zone (FIG. 10C).

In this case, as the execution instruction buttons Bm of "zoning setting", three types of execution instruction buttons Bm each capable of designating a corresponding one of the left, center, and right zones are prepared, and the user can select any button from among the execution instruction buttons Bm as a button to be deployed on the operation screen Gm.

In a case where the execution instruction button Bm of "zoning setting" is operated, control for achieving composition for tracking the subject recognized in the zone corresponding to the operated execution instruction button Bm is performed.

Here, for the subject tracking pertaining to "zoning setting", in a case where a plurality of subjects is present in the designated zone, a person closest to the center in the designated zone is set as a subject to be tracked.

Note that, as in the case of "subject tracking" described above, a rate of change from the current composition to the composition for tracking the target subject conforms to the rate of change information set in "common setting". Furthermore, also for the subject tracking pertaining to "zoning setting", in a case where a position detection state of the target subject is poor, the tracking is disabled to cause the composition to slowly change, so that it is possible to prevent the change in composition from becoming unnatural (image from becoming strange).

"Hand-Held Feeling"

This is a function of giving an effect as if the captured image is captured by a hand-held camera, and is applied only to the slave cameras 3 in the present example.

In the present example, control for giving a hand-held feeling is performed by randomly changing a camera image-capture direction. Since this control is applied only to the slave cameras 3, the control is implemented as pan and tilt control of each pan head 4.

In the present example, a degree of the hand-held feeling can be set according to a user operation.

In a case where the execution instruction button Bm of "hand-held feeling" is operated, the image-capture direction is controlled to give the hand-held feeling by the degree set for the operated execution instruction button Bm.

"Common Setting"

This is a common setting option pertaining to composition control. In the present example, the rate of change in composition can be set as "common setting".

FIG. 11 illustrates a change from the above-described composition as "FF" to the composition as "BS" as an example of the change in composition. As "common setting", a rate of such a change in composition can be set on the basis of a user operation.

Here, in the present example, the rate of change in composition set in "common setting" is applied to a change in composition for all the CAMs 1 to 7, but a camera to which "common setting" is applied may be designated.

Furthermore, "common setting" may be set for each camera.

(3-3. GUI for Selection of Button to be Deployed and Setting of Control Information)

Subsequently, GUIs pertaining to selection of the execution instruction button Bm to be deployed on the operation screen Gm and setting of various types of information pertaining to composition control will be described with reference to FIGS. 12 to 20.

Figure 12:
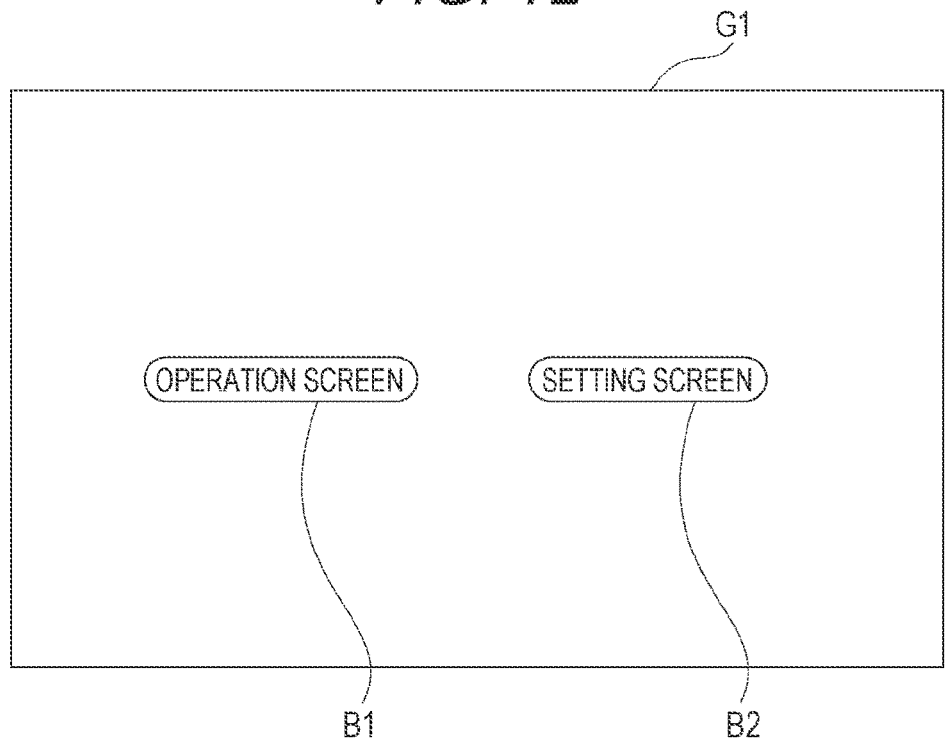
FIG. 12 is a diagram illustrating an example of an initial screen.

FIG. 12 illustrates an example of an initial screen G1.

The initial screen G1 is a screen displayed by the display unit 17 when an application (application program) for enabling composition control using the operation screen Gm illustrated in FIG. 7 is launched.

Figure 13:
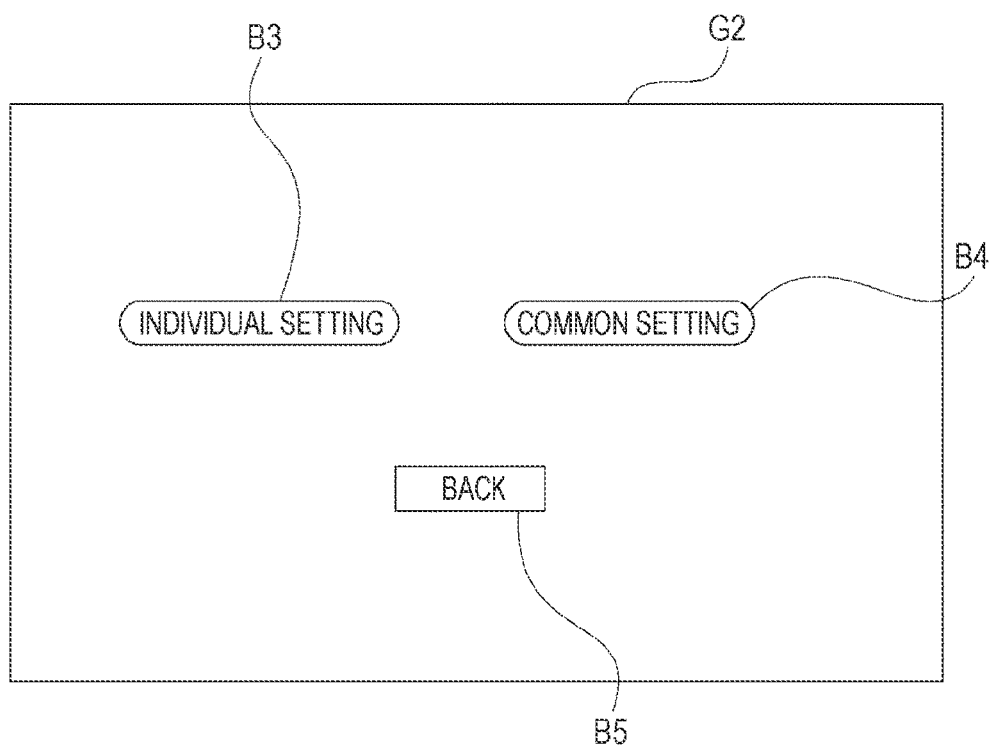
FIG. 13 is a diagram illustrating an example of a setting menu screen.

The initial screen G1 is provided with an operation screen button B1 and a setting screen button B2, and the user can give an instruction to call the operation screen Gm illustrated in FIG. 7 by operating the operation screen button B1, and can give an instruction to call a setting menu screen G2 illustrated in FIG. 13 by operating the setting screen button B2.

In FIG. 13, the setting menu screen G2 is provided with an individual setting button B3, a common setting button B4, and a back button B5. The individual setting button B3 is a button for giving an instruction to call a selection and setting reception screen Gs illustrated in FIG. 15 to be described later, the common setting button B4 is a button for giving an instruction to call a common setting screen Gc illustrated in FIG. 14, and the back button B5 is a button for giving an instruction to return to the initial screen G1 illustrated in FIG. 12.

Figure 14:
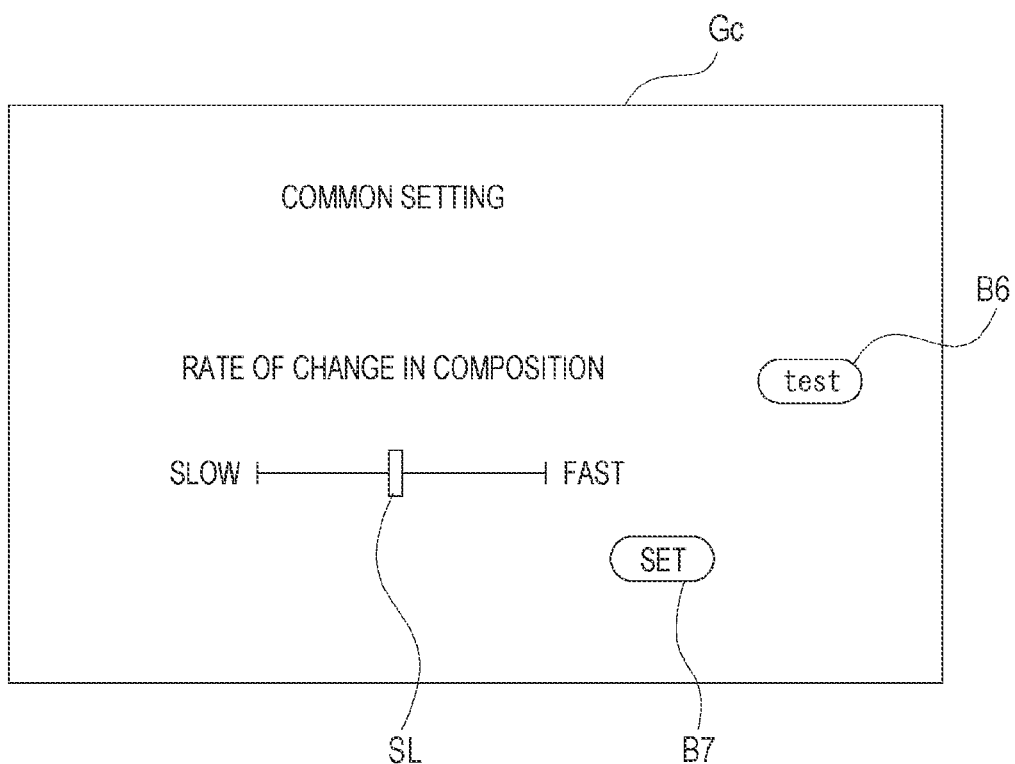
FIG. 14 is a diagram illustrating an example of a common setting screen.

In FIG. 14, the common setting screen Gc is a screen on which the rate of change in composition can be set as "common setting" described above, and is provided with, as illustrated in the drawing, a slider SL for designating (inputting) the rate of change in composition, a test button B6, and a setting button B7. The user can designate the rate of change in composition by adjusting a position of the slider SL provided on a slide bar, and can give an instruction to set the rate of change in composition at the designated rate by operating the setting button B7.

The test button B6 is a button for previewing the change in composition at the rate designated using the slider SL. Although not illustrated in the drawing, in a case where the test button B6 is operated, an image corresponding to a case where composition is changed at the designated rate is displayed as a preview on the display unit 17.

Figure 15:
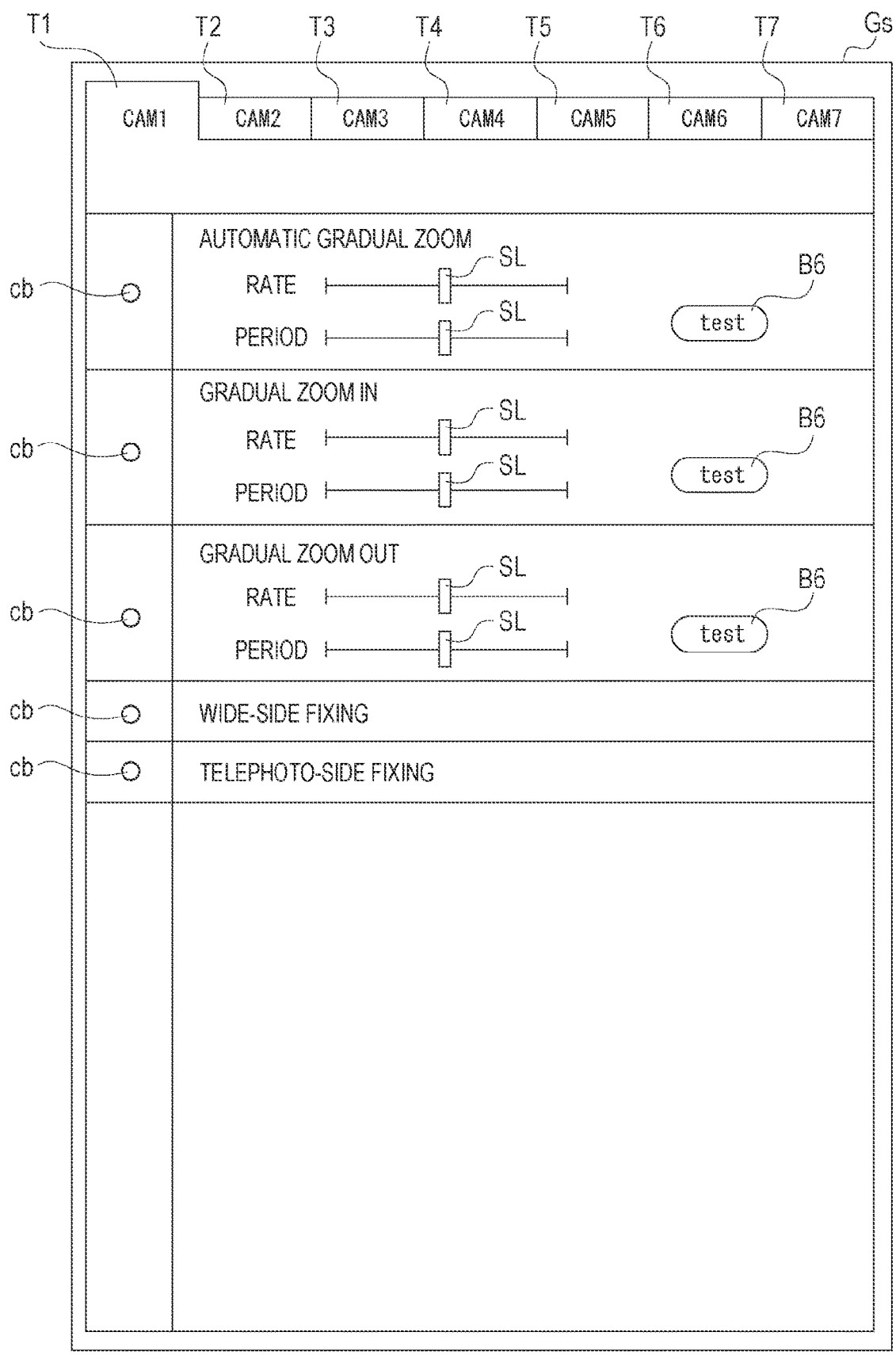
FIG. 15 is a diagram illustrating an example of a selection and setting reception screen (with a CAM 1 to a CAM 3 selected).

In FIG. 15, the selection and setting reception screen Gs is a screen that receives selection of a button to be deployed on the operation screen Gm from among the various execution instruction buttons Bm for each camera, and receives, for the execution instruction button Bm to which control information regarding composition control can be individually set, a setting of the control information.

The selection and setting reception screen Gs is provided with a tab T (tab T1 to tab T7) for each camera of the CAM 1 to the CAM 7, and the user can select a camera to be subject to the selection of the button to be deployed and the setting of the control information by selecting any of the tabs T1 to T7.

FIG. 15 illustrates an example of the selection and setting reception screen Gs with the tab T1 corresponding to the CAM 1 selected. Note that, in the present example, the types of the execution instruction buttons Bm that can be deployed on the operation screen Gm are the same among the CAM 1 to the CAM 3 as the virtual cameras, so that the display content of the selection and setting reception screen Gs also becomes similar. Therefore, only the display content of the CAM 1 will be described here, and no description will be given of the display content of the CAM 2 and the display content of the CAM 3 in order to avoid the description from being redundant.

As illustrated in FIG. 15, on the selection and setting reception screen Gs with the tab T of the virtual camera selected, the options of "automatic gradual zoom", "gradual zoom in", "gradual zoom out", "wide-side fixing", and "telephoto-side fixing" are displayed, and a check box cb for selecting whether or not to deploy a corresponding execution instruction button Bm on the operation screen Gm is provided for each of the options. The user can give, by performing an operation of checking the check box cb, an instruction to deploy the execution instruction button Bm of the checked option on the operation screen Gm.

As illustrated in the drawing, sliders SL for designating the zoom speed and the zoom period are provided for each of the options of "automatic gradual zoom", "gradual zoom in", and "gradual zoom out", and the user can designate each of the zoom speed and the zoom period by adjusting the position of a corresponding slider SL on the slide bar.

Here, information regarding the zoom period can also be referred to as information for designating a zoom start angle of view and a zoom end angle of view.

Furthermore, in the present example, a test button B6 is also deployed for each of the options of "automatic gradual zoom", "gradual zoom in", and "gradual zoom out". Although not illustrated in the drawing, in a case where the test button B6 is operated, an image corresponding to a case where zoom control is performed at the designated zoom speed and over the designated zoom period is displayed as a preview on the display unit 17.

Note that, in the present example, zoom control information (here, the zoom speed and the zoom period) regarding "automatic gradual zoom", "gradual zoom out", and "gradual zoom in" can be individually set for "gradual zoom out" and "gradual zoom in", but in a case where the zoom control information is set for at least any one of the options of "automatic gradual zoom", "gradual zoom out", and "gradual zoom in", the set zoom control information can be used as information for setting the zoom control information for the remaining options.

Figure 16:
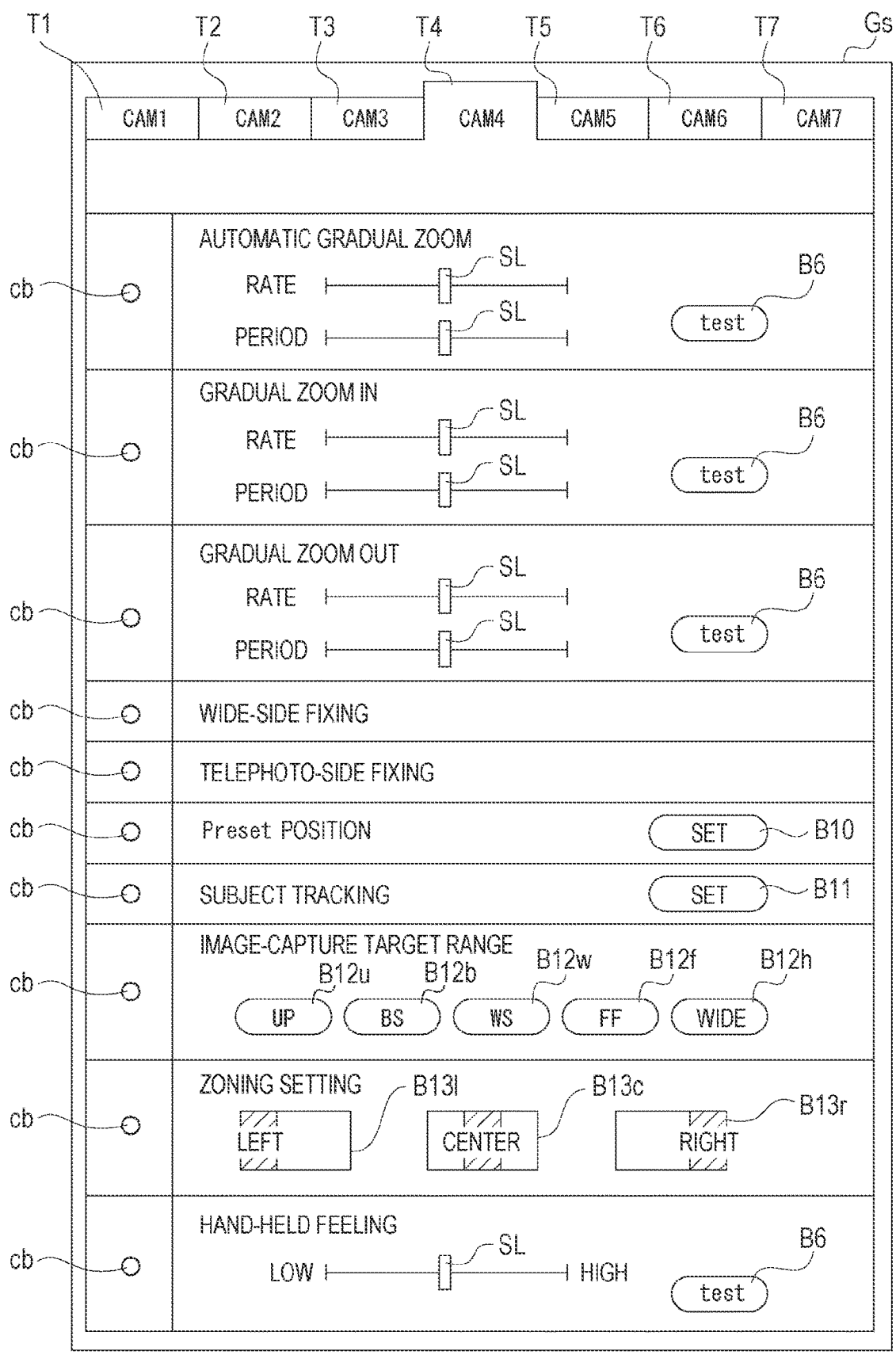
FIG. 16 is a diagram illustrating an example of a selection and setting reception screen (with a CAM 4 to a CAM 7 selected).

FIG. 16 illustrates the selection and setting reception screen Gs with the tab T4 corresponding to the CAM 4 as the real camera selected.

In the present example, the types of the execution instruction buttons Bm that can be deployed on the operation screen Gm are the same among the CAMs 4 to 7 as the real cameras, so that display content of the selection and setting reception screen Gs also becomes similar, and therefore, only the display content of the CAMs 4 will be described here, and no description will be given of the display content of the CAM 5 to the display content of the CAM 7 in order to avoid the description from being redundant.

On the selection and setting reception screen Gs with the tab T corresponding to the real camera selected, in addition to the options such as "automatic gradual zoom" displayed in a case of the virtual camera, the options of "Preset position", "subject tracking", "image-capture target range", "zoning setting", and "hand-held feeling" are displayed. Also for each option additionally displayed, a check box cb for selecting whether or not to deploy a corresponding execution instruction button Bm on the operation screen Gm is provided, and the user can give, by performing an operation of checking the check box cb, an instruction to deploy the execution instruction button Bm of the checked option on the operation screen Gm.

For the option of "Preset position", a "set" button B10 for transitioning to a setting screen G3 of the Preset position is deployed.

Figure 17:
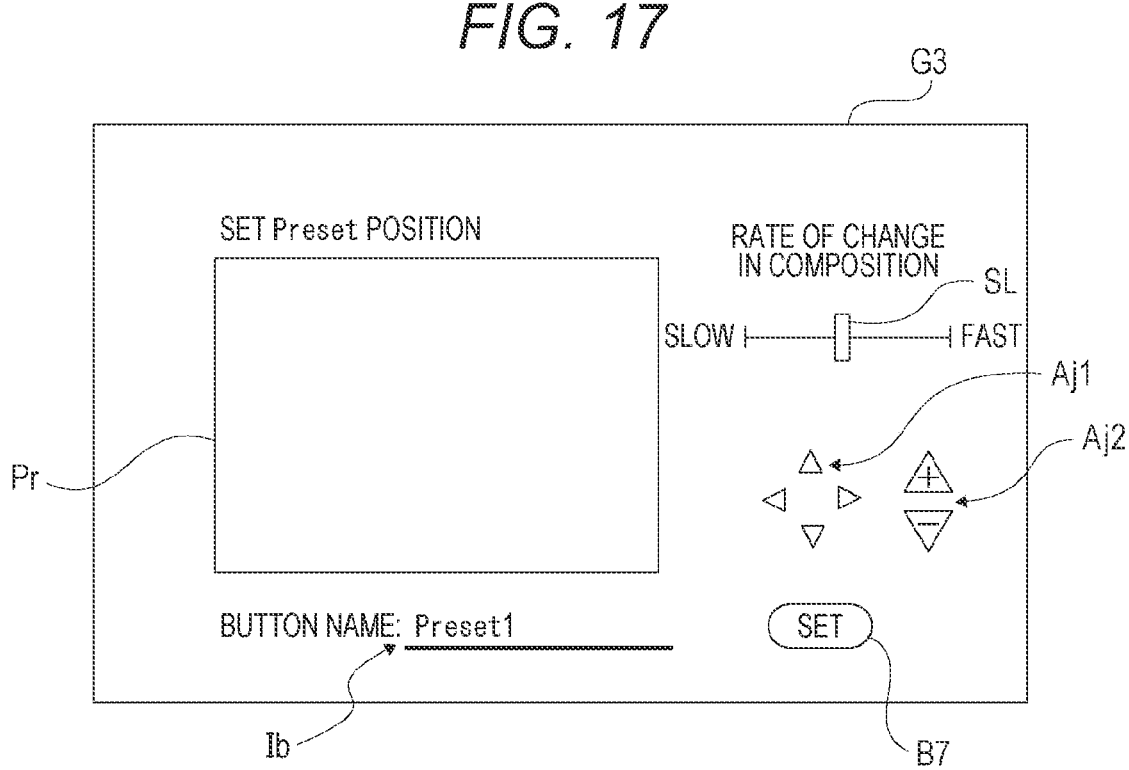
FIG. 17 is a diagram illustrating an example of a setting screen of "Preset position".

In a case where the "set" button B10 is operated, the display unit 17 is caused to display the setting screen G3 illustrated in FIG. 17. On the setting screen G3, an adjustment operation element Aj1 for adjusting a position to be set as the Preset position from the image captured by the master camera 2, an adjustment operation element Aj2 for giving an instruction to make a zoom adjustment, a preview region Pr for previewing the image captured by the master camera 2, a slider SL for designating the rate of change in composition, an input box Ib for receiving input of name information of the execution instruction button Bm, and a setting button B7 are deployed.

In the present example, a cross key is deployed as the adjustment operation element Aj1, and the user can change, by operating the cross key, the position of a mark (displayed in the preview region Pr, although not illustrated in the drawing) for designating the position to be set as the Preset position from the image captured by the master camera 2.

Furthermore, as the adjustment operation element Aj2, a + button for giving an instruction to zoom in and a − button for giving an instruction to zoom out are deployed, and the user can also give, by operating such buttons, an instruction to make the zoom adjustment (angle of view adjustment). Note that it is not essential to enable the zoom adjustment.

Furthermore, the user can input, to the input box Ib, name information desired to be set to the execution instruction button Bm. In a case of the present example, name information indicating "Preset" is input in advance to the input box Ib. This name information is input in such a manner that the last digit is incremented according to the number of Preset positions. In a case where it is desired to set different name information, the user performs an operation of inputting character information to the input box Ib.

Note that a configuration where the name information can be selected from among a plurality of candidates may be employed.

The user can give, by operating the setting button B7 on the setting screen G3, an instruction to set the position designated using the mark described above, the rate designated using the slider SL, and the name information input to the input box Ib as the Preset position, the rate of change in composition for the Preset position, and the name information of the execution instruction button Bm.

The rate of change in composition for the Preset position is only required to be applied as at least one of the rate of change in composition when a change in composition to the Preset position is made or the rate of change in composition when a change in composition from the Preset position to another composition is made, but in the present example, the rate of change in composition is applied to the former change in composition.

Note that, although the case where the rate of change in composition for the Preset position can be individually set has been given as example, the rate of change in composition for the Preset position may adhere to "common setting" described above.

Figure 18:
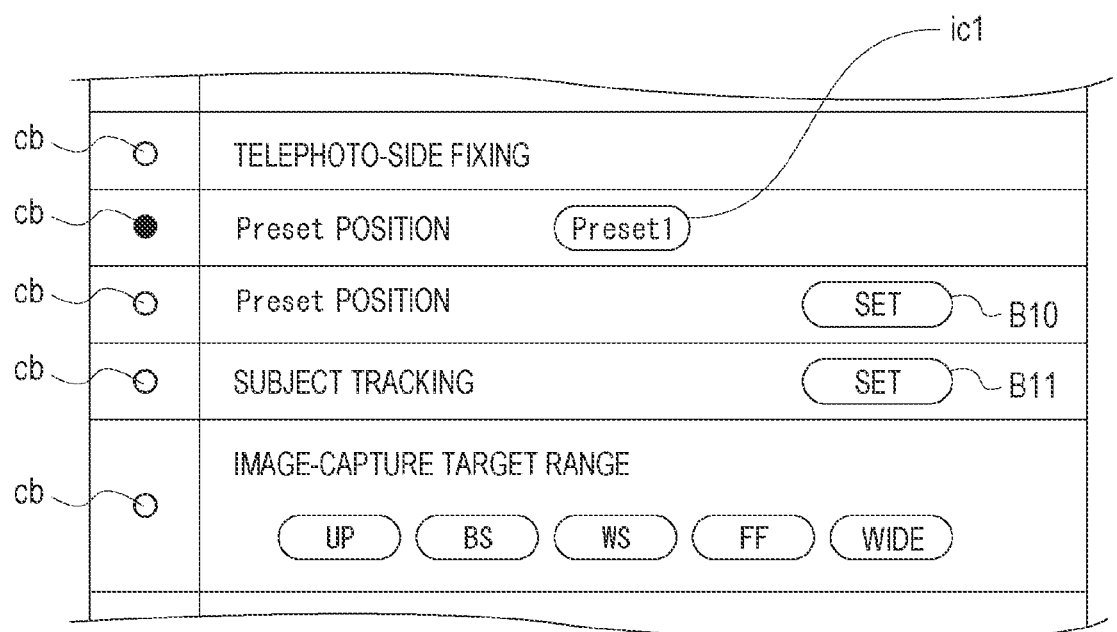
FIG. 18 is a diagram illustrating a state of the selection and setting reception screen in a case where "Preset position" is set.

In a case where the setting button B7 on the setting screen G3 is operated, the screen display on the display unit 17 returns to the screen display illustrated in FIG. 16, but at this time, as illustrated in FIG. 18, an option to which the setting information set on the setting screen G3 is reflected is additionally displayed as the option of "Preset position" on the selection and setting reception screen Gs. In the option additionally displayed, an icon ic1 of the execution instruction button Bm of "Preset position" set on the setting screen G3 (here, an icon of the execution instruction button Bm in which name information of "Preset1" is set) is displayed. Furthermore, for the option additionally displayed, the check box cb is automatically checked. That is, selection is automatically made as a button to be deployed on the operation screen Gm so as to reduce a burden of user operation pertaining to the selection of a button to be deployed.

Returning to FIG. 16, in the option of "subject tracking", a "set" button B11 for transitioning to a subject tracking setting screen G4 is deployed.

Figure 19:
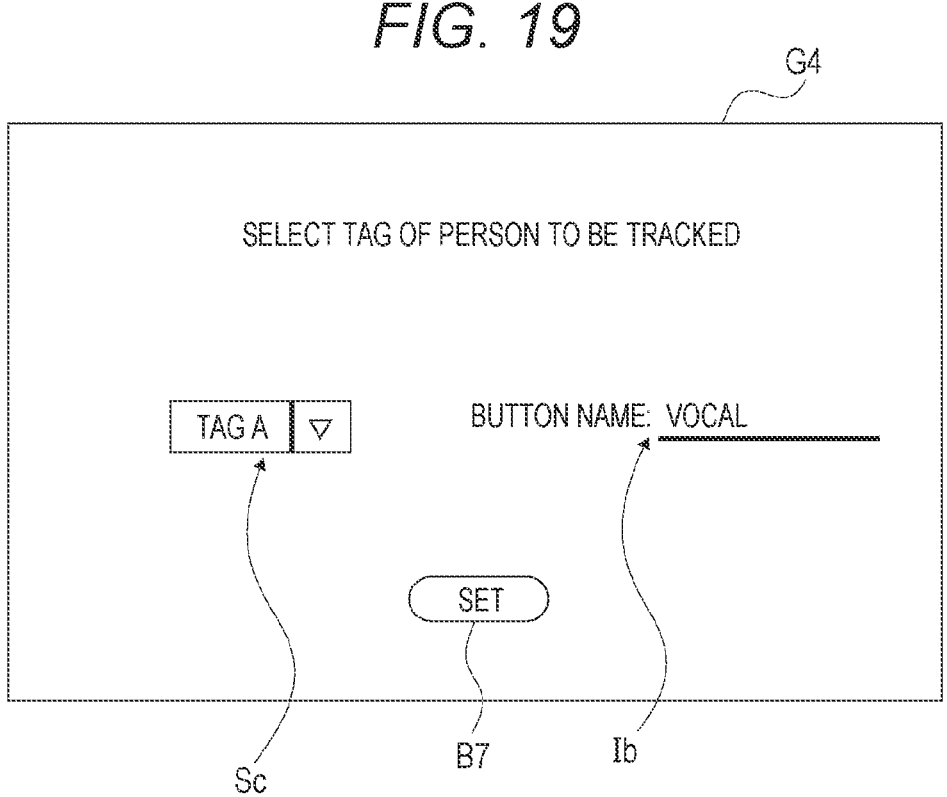
FIG. 19 is a diagram illustrating an example of a setting screen of "subject tracking".

In a case where the "set" button B11 is operated, the display unit 17 is caused to display a setting screen G3 illustrated in FIG. 19. On the setting screen G4, a selection reception section Sc for receiving selection of the radio tag of the subject to be tracked, an input box Ib for receiving input of name information of the execution instruction button Bm, and a setting button B7 are deployed.

In the present example, the selection reception section Sc is configured to display a list of selectable radio tags as a pull-down menu and receive selection. Furthermore, in the input box Ib, the user can input name information desired to be set to the execution instruction button Bm. Note that the name information set to the button may be selected from among a plurality of candidates.

The user can give, by operating the setting button B7 on the setting screen G4, an instruction to set the subject (radio tag) selected using the selection reception section Sc and the name information input to the input box Ib as the subject to be tracked and the name information of the execution instruction button Bm, respectively.

Figure 20:
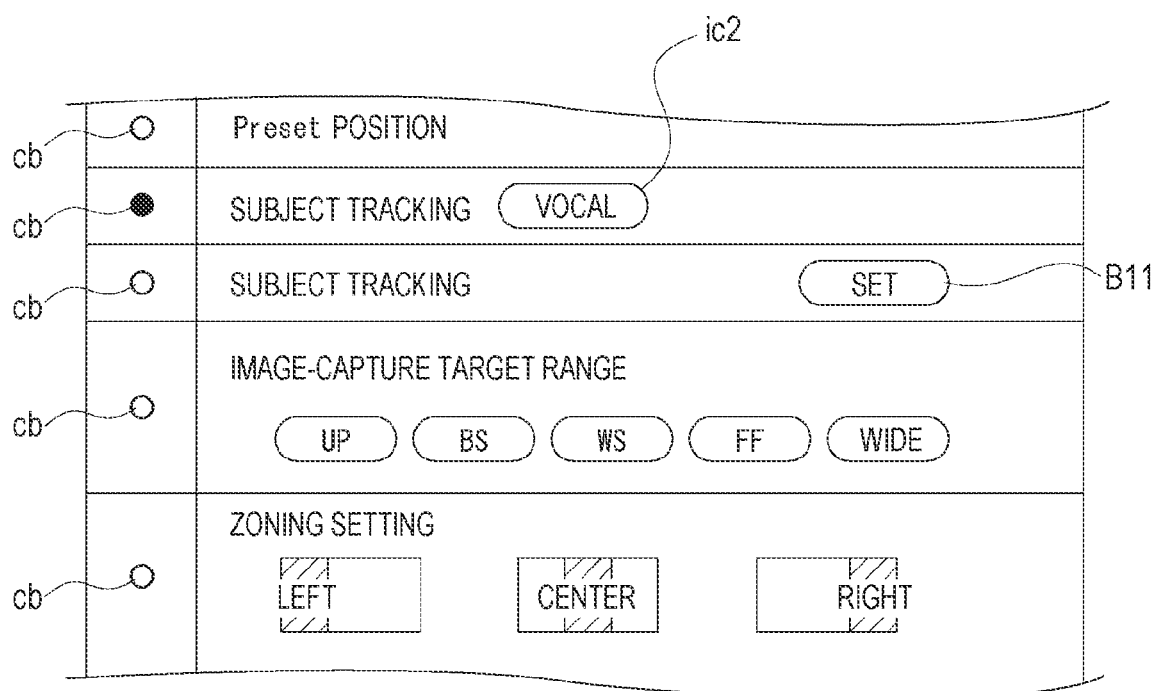
FIG. 20 is a diagram illustrating a state of the selection and setting reception screen in a case where a setting regarding "subject tracking" is made.

In a case where the setting button B7 on the setting screen G4 is operated, the screen display on the display unit 17 returns to the screen display illustrated in FIG. 16, but at this time, as illustrated in FIG. 20, an option to which the setting information set on the setting screen G4 is reflected is additionally displayed as the option of "subject tracking" on the selection and setting reception screen Gs. In the option additionally displayed, an icon ic2 of the execution instruction button Bm of "subject tracking" set on the setting screen G4 (here, an icon of the execution instruction button Bm to which name information of "vocal" is set) is displayed. Furthermore, the option additionally displayed has the check box cb automatically checked so as to be automatically selected as a button to be deployed on the operation screen Gm.

In FIG. 16, selection buttons B12u, B12b, B12w, B12f, and B12h for selecting the above-described image-capture target ranges of "UP", "BS", "WS", "FF", and "wide" are deployed in the option of "image-capture target range", and the user can select the execution instruction button Bm to be displayed on the operation screen Gm (a plurality of execution instruction buttons Bm can be selected) by selecting such selection buttons B12.

With the selection button B12 selected, the user can give, by performing an operation of checking the check box cb corresponding to the option of "image-capture target range", an instruction to deploy the execution instruction button Bm for the image-capture target range selected from among "UP", "BS", "WS", "FF", and "wide" on the operation screen Gm.

In the option of "zoning setting", selection buttons B13l, B13c, and B13r for selecting the above-described zoning setting of "left", "center", and "right" are deployed, and the user can select the execution instruction button Bm to be displayed on the operation screen Gm (a plurality of execution instruction buttons Bm can be selected) by selecting such selection buttons B13.

With the selection button B13 selected, the user can give, by performing an operation of checking the check box cb corresponding to the option of "zoning setting", an instruction to deploy the execution instruction button Bm for the zoning setting selected from among "left", "center", and "right" on the operation screen Gm.

A slider SL and a test button B6 for designating the strength of the hand-held feeling are deployed in the option of "hand-held feeling". Although not illustrated in the drawing, in a case where the test button B6 deployed in the option of "hand-held feeling" is operated, an image corresponding to a case where the composition of "hand-held feeling" is changed according to the strength designated using the slider SL is displayed as a preview on the display unit 17.

For "hand-held feeling", it is possible to give, by performing an operation of checking a corresponding check box cb, an instruction to deploy, on the operation screen Gm, the execution instruction button Bm for giving an instruction to perform the composition control of "hand-held feeling" according to the strength designated using the slider SL.

Note that the strength of "hand-held feeling" is expressed as a change in at least one of the magnitude of a blur of composition or the speed of the blur.

(3-4. Functional Block)

Figure 21:
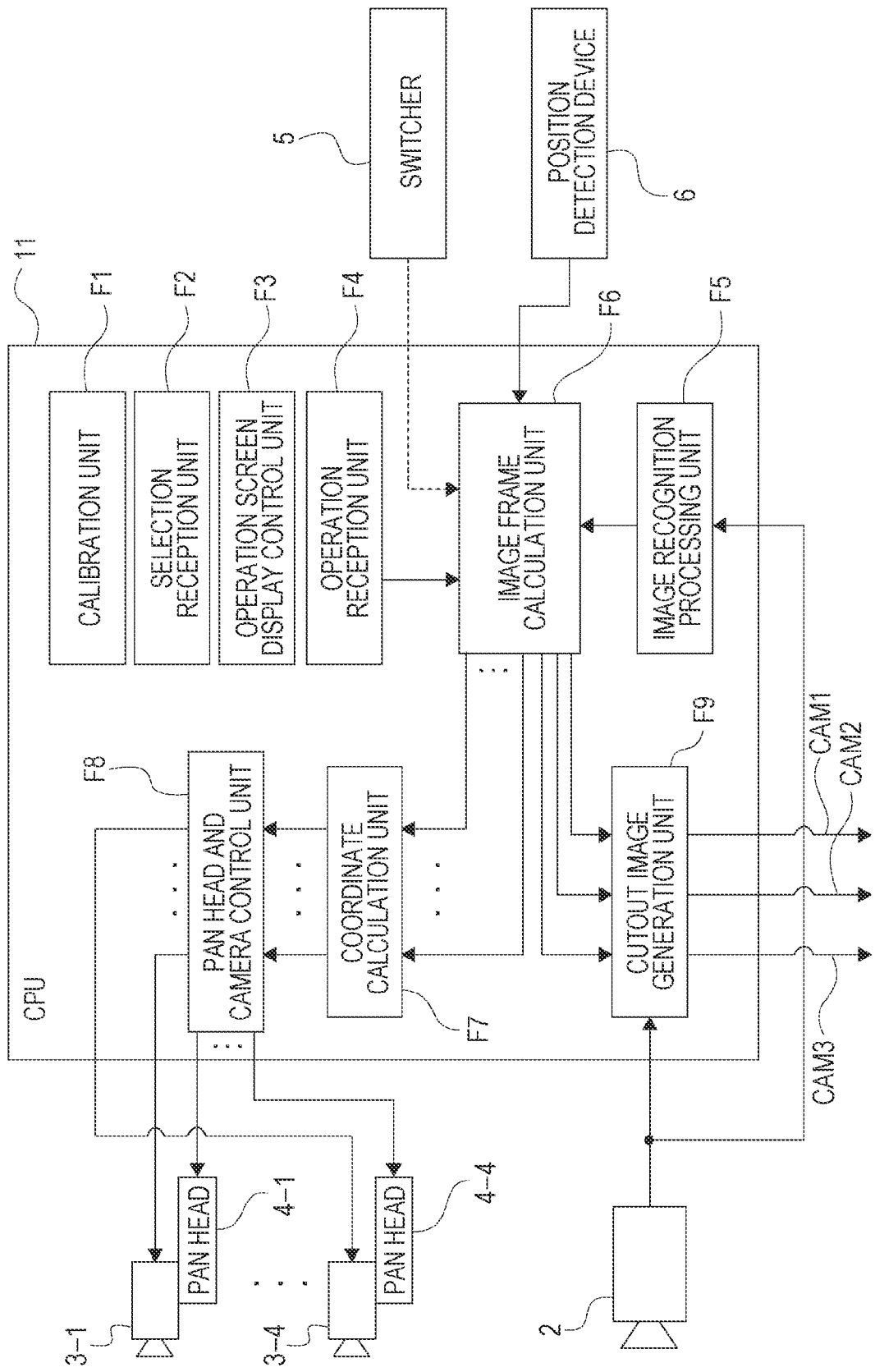
FIG. 21 is a diagram for describing functions the information processing device as the embodiment has.

FIG. 21 is a diagram for describing functions the CPU 11 of the information processing device 1 has, and illustrates the master camera 2, the slave cameras 3, the pan heads 4, the switcher 5, and the position detection device 6 illustrated in FIG. 1 together with functional blocks of the various functions the CPU 11 has.

As illustrated in the drawing, the CPU 11 functions as a calibration unit F1, a selection reception unit F2, an operation screen display control unit F3, an operation reception unit F4, an image recognition processing unit F5, an image frame calculation unit F6, a coordinate calculation unit F7, a pan head and camera control unit F8, and a cutout image generation unit F9.

The calibration unit F1 performs calibration processing for obtaining a coordinate transformation matrix for use in coordinate transformation between a coordinate system of the image captured by the master camera 2 and a coordinate system of an image-capture range of each slave camera 3. The image-capture range of the slave camera 3 means a range in which image-capture can be made using panning and tilting with the pan head 4.

As understood from the above description, in the present example, target composition when composition control is performed according to the operation of the execution instruction button Bm on the operation screen Gm is determined on the basis of the image captured by the master camera 2. For example, an image frame in accordance with the image-capture target range such as "BS" or "WS" is determined on the basis of a result of image recognition processing performed on the image captured by the master camera 2. Therefore, with the coordinate system of the image captured by the master camera 2 as a master coordinate system, information regarding the range of the image frame in the coordinate system of the slave camera 3 is obtained by making coordinate transformation, and the pan head 4 and the zoom of the slave camera 3 are controlled on the basis of the information regarding the range of the image frame in the coordinate system of the slave camera 3 so as to achieve composition with the image frame defined in the master coordinate system.

The calibration unit F1 performs calibration processing for obtaining a coordinate transformation matrix for use in the coordinate transformation.

Specifically, in the calibration processing, the display unit 17 is caused to display the image captured by the slave camera 3 and the image captured by the master camera 2 subject to the calibration processing to cause the user to perform an operation of designating a position at which the same position on the real space is shown in each image. On the basis of information regarding the designated position, a coordinate transformation matrix for use in transformation of coordinate information of the coordinate system of the master camera 2 into coordinate information of the coordinate system of the slave camera 3 can be obtained. Here, the coordinate transformation matrix is obtained for each slave camera 3.

Note that, although not illustrated in the drawing, at the time of calibration, the image captured by the slave camera 3 subject to the calibration is input to the information processing device 1.

The selection reception unit F2 receives selection of the execution instruction button Bm to be applied to image-capture control from among the execution instruction buttons Bm pf the plurality of options such as "automatic gradual zoom", "Preset position", and "subject tracking" described above. Specifically, the selection and setting reception screen Gs illustrated in FIG. 16 is displayed by the display unit 17, and the setting of the control information pertaining to the composition control for a specific execution instruction button Bm such as the selection of the execution instruction button Bm to be deployed on the operation screen Gm, the position setting for "Preset position", and the setting of the rate of change in composition is received.

As can be seen with reference to the selection and setting reception screen Gs in FIG. 16, in the present example, the selection of the execution instruction button Bm to be deployed and the setting of the control information are received for each camera of the CAM 1 to the CAM 7.

The operation screen display control unit F3 performs control to cause the display unit 17 to display the operation screen Gm described above. Specifically, display control of the operation screen Gm (operation panel) on which the execution instruction button Bm selected on the selection and setting reception screen Gs is deployed is performed.

The operation reception unit F4 receives an operation performed on the operation screen Gm. The operation reception unit F4 recognizes to which of the CAM 1 to the CAM 7 the operated execution instruction button Bm belongs.

The image recognition processing unit F5 performs image recognition processing on the image captured by the master camera 2. The image recognition processing here includes at least processing of recognizing the face, position, and range of the subject as a person, and bone estimation of the subject recognized as a person (generation of a simplified human body model representing a structure of a human body using main parts such as a face, a torso, an arm, and a leg).

In the present example, information regarding the position of the subject for use in "subject tracking" and the like is collectively obtained using not only the result of detection made by the position detection device 6 but also the subject recognition result based on the image captured by the master camera 2. That is, in order to calculate the image frame for tracking a certain subject, the image frame calculation unit F6 to be described below obtains information regarding the position of the subject on the basis of the result of position detection made by the position detection device 6 and the result of subject recognition made by the image recognition processing unit F5.

The image frame calculation unit F6 calculates the image frame for achieving composition according to the operation state of the execution instruction button Bm on the operation screen Gm. As understood from the above description, the image frame referred to herein is an image frame in the coordinate system of the image captured by the master camera 2. The image frame is calculated for each camera on the basis of the operation state of the execution instruction button Bm for each camera.

As a specific example, for a certain camera, for example, in a state where "vocal" is operated as the execution instruction button Bm of "subject tracking" and "UP" is operated as the execution instruction button Bm of "image-capture target range", the image frame calculation unit F6 acquires information necessary for performing image-capture control in accordance with such execution instruction buttons Bm. Specifically, for the execution instruction button Bm of "vocal", position information regarding the subject as "vocal" is required, so that the position information is acquired on the basis of the result of position detection made by the position detection device 6 and the result of subject recognition made by the image recognition processing unit F5. Furthermore, for the execution instruction button Bm of "UP", bone estimation information regarding the subject as "vocal" is required, so that the bone estimation information is acquired from the image recognition processing unit F5. Then, on the basis of such pieces of information thus acquired, an image frame for capturing "vocal" with the angle of view according to the image-capture target range as "UP" is calculated.

Furthermore, for the execution instruction button Bm of "Preset position", information regarding the Preset position set on the setting screen G3 for the execution instruction button Bm is acquired as necessary information, and an image frame for achieving composition allowing the Preset position to be contained in the captured image is calculated.

Moreover, in a state where the execution instruction button Bm of "zoning setting" is operated, information regarding the result of subject recognition made by the image recognition processing unit F5 is acquired as necessary information, a subject recognized in a zone (any one of left, center, or right in the present example) corresponding to the execution instruction button Bm (a subject closest to the center in the designated zone in a case where a plurality of subjects is recognized in the zone as described above) is determined as the subject to be tracked, and an image frame for achieving composition for tracking the to be tracked is calculated.

Furthermore, for example, in a state where the execution instruction button Bm of gradual zoom such as "automatic gradual zoom" and the execution instruction button Bm of "hand-held feeling" are operated, information regarding the zoom speed and the zoom period and information regarding the strength of the hand-held feeling set for their respective execution instruction buttons Bm are acquired as the necessary information, and an image frame for achieving a change in composition as gradual zoom and a change in composition as the hand-held feeling is calculated on the basis of such pieces of information thus acquired.

Note that in a case where the execution instruction button Bm of "wide-side fixing" and the execution instruction button Bm of "telephoto-side fixing" are operated, identification information regarding the execution instruction buttons Bm is acquired as necessary information. As described above, "wide-side fixing" and "telephoto-side fixing" are functions of moving to the wide-side limit position (wide side of the preset movable range of gradual zoom) and the telephoto-side limit position (telephoto side of the preset movable range of gradual zoom) within the zoom movable range as quickly as possible, and holding composition at the position, and in a case where the execution instruction button Bm is operated, the image frame calculation unit F6 calculates the image frame for achieving such a change in composition.

The coordinate calculation unit F7 transforms information regarding the image frame (coordinate information based on the coordinate system of the master camera 2) for the slave camera 3 (in the present example, the CAM 4 to the CAM 7) calculated by the image frame calculation unit F6 into coordinate information based on the coordinate system of the slave camera 3. For this coordinate transformation, the coordinate transformation matrix obtained by the calibration unit F1 is used.

On the basis of the information regarding the image frame subjected to the coordinate transformation by the coordinate calculation unit F7, the pan head and camera control unit F8 controls the panning and tilting of the pan head 4 and the zoom of the slave camera 3 as necessary for each slave camera 3 so as to achieve composition for capturing the range indicated by the information regarding the image frame.

The cutout image generation unit F9 clips an image from the image captured by the master camera 2 as necessary in accordance with the information regarding the image frame (coordinate information based on the coordinate system of the master camera 2) for the virtual camera (the CAM 1 to the CAM 3 in the present example) calculated by the image frame calculation unit F6, and generates captured images of the CAM 1, the CAM 2, and the CAM 3.

4. Processing Procedure

FIG. 22 is a flowchart illustrating processing pertaining to the display of the selection and setting reception screen Gs and the operation screen Gm.

FIG. 22A illustrates a flowchart of processing pertaining to the selection of the execution instruction button Bm to be deployed on the operation screen Gm and the reception of the setting of the control information.

First, in step S101, the CPU 11 performs processing of displaying the selection and setting reception screen Gs. That is, for example, in response to the operation of the individual setting button B3 on the setting menu screen G2 illustrated in FIG. 13, processing of displaying the selection and setting reception screen Gs illustrated in FIGS. 15 and 16 on the display unit 17 is performed.

In step S102 subsequent to step S101, the CPU 11 performs, as selection and setting reception processing, processing of receiving the selection of the execution instruction button Bm to be deployed on the operation screen Gm and the setting of the control information regarding a specific execution instruction button Bm such as "automatic gradual zoom". Specifically, processing such as processing of displaying the setting screens G3 and G4 in response to the operation of the check box cb, the operation of the slider SL, and the operation of the "set" button B10 or B11 described above is performed.

In step S103 subsequent to step S102, the CPU 11 checks whether or not a completion operation is performed. That is, whether or not an operation of giving an instruction to complete the selection of the execution instruction button Bm to be deployed on the operation screen Gm and the setting of the control information is performed is checked. Note that, as the completion operation, for example, it is conceivable that an operation of a predetermined operation element deployed on the selection and setting reception screen Gs or the like may be performed.

When the completion operation has not been performed, the CPU 11 continues the selection and setting reception processing in step S102.

In a case where the completion operation is performed, the CPU 11 proceeds to step S104 and performs processing of recording selection and setting information. That is, processing of storing the selection information regarding the execution instruction button Bm for each camera received in the selection and setting reception processing in step S102 and the control information set for each selected specific execution instruction button Bm as the selection and setting information into a predetermined storage device such as the non-volatile memory unit 14 or the storage unit 19 is performed.

In response to the execution of the storage processing in step 3104, the CPU 11 brings the series of processing illustrated in FIG. 22A to an end.

FIG. 22B illustrates a flowchart of processing pertaining to the display of the operation screen Gm.

As illustrated in the drawing, the CPU 11 first waits in step S201 until the operation screen button B1 (see the initial screen G1 in FIG. 12) is operated, and causes the processing to proceed to step S202 in response to the operation of the operation screen button B1.

In step S202, the CPU 11 performs processing of displaying the operation screen Gm on the basis of the selection and setting information. Specifically, the processing of causing the display unit 17 to display the operation screen Gm in which the selected execution instruction button Bm is deployed for each camera is performed on the basis of the selection and setting information stored in step S104 described above.

In response to the execution of the processing in step S202, the CPU 11 brings the series of processing illustrated in FIG. 22B to an end.

Figure 23:
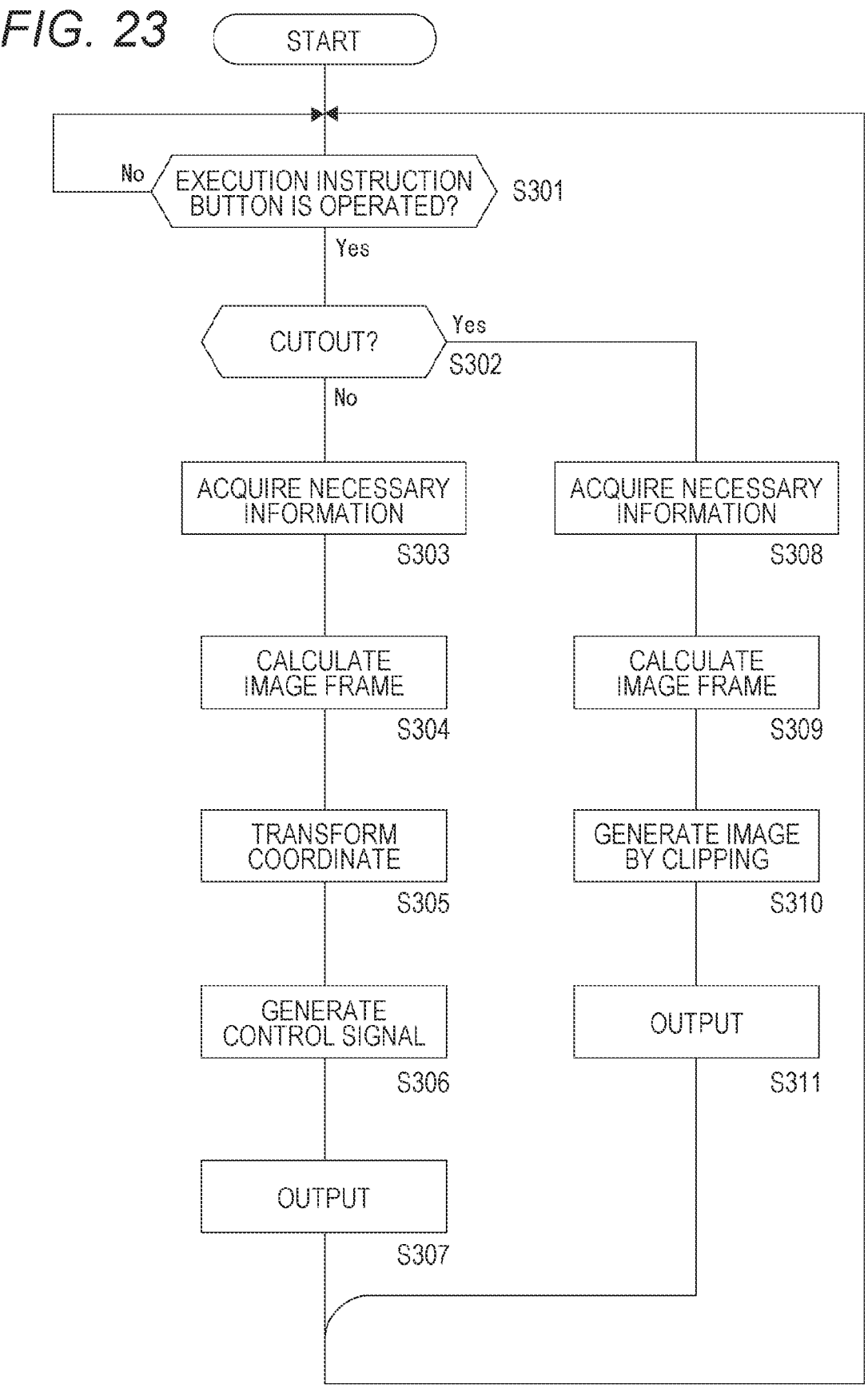
FIG. 23 is a flowchart illustrating processing to be performed while the operation screen is displayed.

FIG. 23 is a flowchart illustrating processing to be performed while the operation screen Gm is displayed.

Here, the CPU 11 performs the processing illustrated in FIG. 23 for each camera of the CAM 1 to the CAM 7. Furthermore, although not illustrated in the drawing, the CPU 11 brings the series of processing illustrated in FIG. 23 to an end in response to the establishment of a predetermined termination condition (for example, a predetermined operation input by the user or the like).

In FIG. 23, in step S301, the CPU 11 checks whether or not the execution instruction button Bm is operated. In a case where the execution instruction button Bm is not operated, the CPU 11 performs the processing in step S301 again.

On the other hand, in a case where the execution instruction button Bm is operated, the CPU 11 determines whether or not cutout is required in step S302. That is, it is determined whether or not the target camera is any one of the virtual cameras CAM 1 to CAM 3.

In a case where it is determined in step S302 that the cutout is not required, the CPU 11 performs necessary information acquisition processing in step S303. This processing is processing of acquiring the above-described necessary information, that is, information necessary for image-capture control for achieving composition corresponding to the execution instruction button Bm that has been operated.

As described above, for example, in a case of the execution instruction button Bm of "subject tracking", the information regarding the result of position detection made by the position detection device 6 and the result of subject recognition made by the image recognition processing unit F5 for obtaining the position information regarding a corresponding subject such as "vocal" corresponds to the necessary information, and in a case of the execution instruction button Bm of "image-capture target range" such as "UP", the bone estimation information regarding the subject corresponds to the necessary information. Furthermore, in a case of the execution instruction button Bm of "Preset position", the information regarding the Preset position set on the setting screen G3 for the execution instruction button Bm corresponds to the necessary information, and in a case of the execution instruction button Bm of gradual zoom such as "automatic gradual zoom" or the execution instruction button Bm of "hand-held feeling", the information regarding the zoom speed and the zoom period and the information regarding the strength of the hand-held feeling set for their respective execution instruction buttons Bm corresponds to the necessary information.

In step S304 subsequent to step S303, the CPU 11 performs image frame calculation processing. This processing corresponds to the above-described processing performed by the image frame calculation unit F6, and is processing of calculating image frame information for achieving composition corresponding to the operated execution instruction button Bm on the basis of the necessary information.

In step S305 subsequent to step S304, the CPU 11 transforms, as coordinate transformation processing, the coordinate information regarding the image frame in the coordinate system of the master camera 2 obtained in step S304 into the coordinate information regarding the coordinate system of the target slave camera 3.

In step S306 subsequent to step S305, the CPU 11 performs, as control signal generation processing, processing of generating a control signal for the pan head 4 of the target slave camera 3 and a control signal for the zoom of the slave camera 3 so as to obtain composition for capturing an image of a range indicated by the information regarding the coordinate-transformed image frame.

Then, in subsequent step S307, the CPU 11 performs processing of outputting the generated control signal to the pan head 4 and the slave camera 3, and returns to step S301.

Furthermore, in a case where it is determined in step S302 described above that cutout is made, the CPU 11 performs necessary information acquisition processing in step S308, and performs image frame calculation processing in subsequent step S309. Note that the necessary information acquisition processing in step S308 and the image frame calculation processing in step S309 are similar to the processing in step S303 and the processing in S304 described above, respectively, and thus no duplicate description will be given.

In response to the execution of the image frame calculation processing in step S309, the CPU 11 generates an image by clipping in step S310. That is, processing of clipping the range of the calculated image frame is performed on the image captured by the master camera 2.

Then, in subsequent step S311, the CPU 11 performs processing of outputting the generated image, and returns to step S301.

Here, the image-capture control according to the execution instruction button Bm can also be performed on the basis of control information regarding switching of the output image by the switcher 5. Specifically, in response to the selection, by the switcher 5, of the output image from among images captured by the plurality of cameras, image-capture control for an image-capture source camera of the selected captured image is started on the basis of the selection information regarding the output image.

In this case, the selection information regarding the output image is input from the switcher 5 to the CPU 11 as indicated by a dashed line in FIG. 21. It is assumed here that the selection information regarding the output image includes at least information that makes the camera (image-capture source camera) of the captured image that is a switching destination identifiable.

Here, in the following description, in such a technique of performing the image-capture control on the basis of the selection information regarding the output image, it is assumed that an operation of selecting (turning on) the execution instruction button Bm desired to perform the image-capture control for each camera is performed in advance on the operation screen Gm.

An example of a specific processing procedure will be described with reference to the flowchart in FIG. 24.

Figure 24:
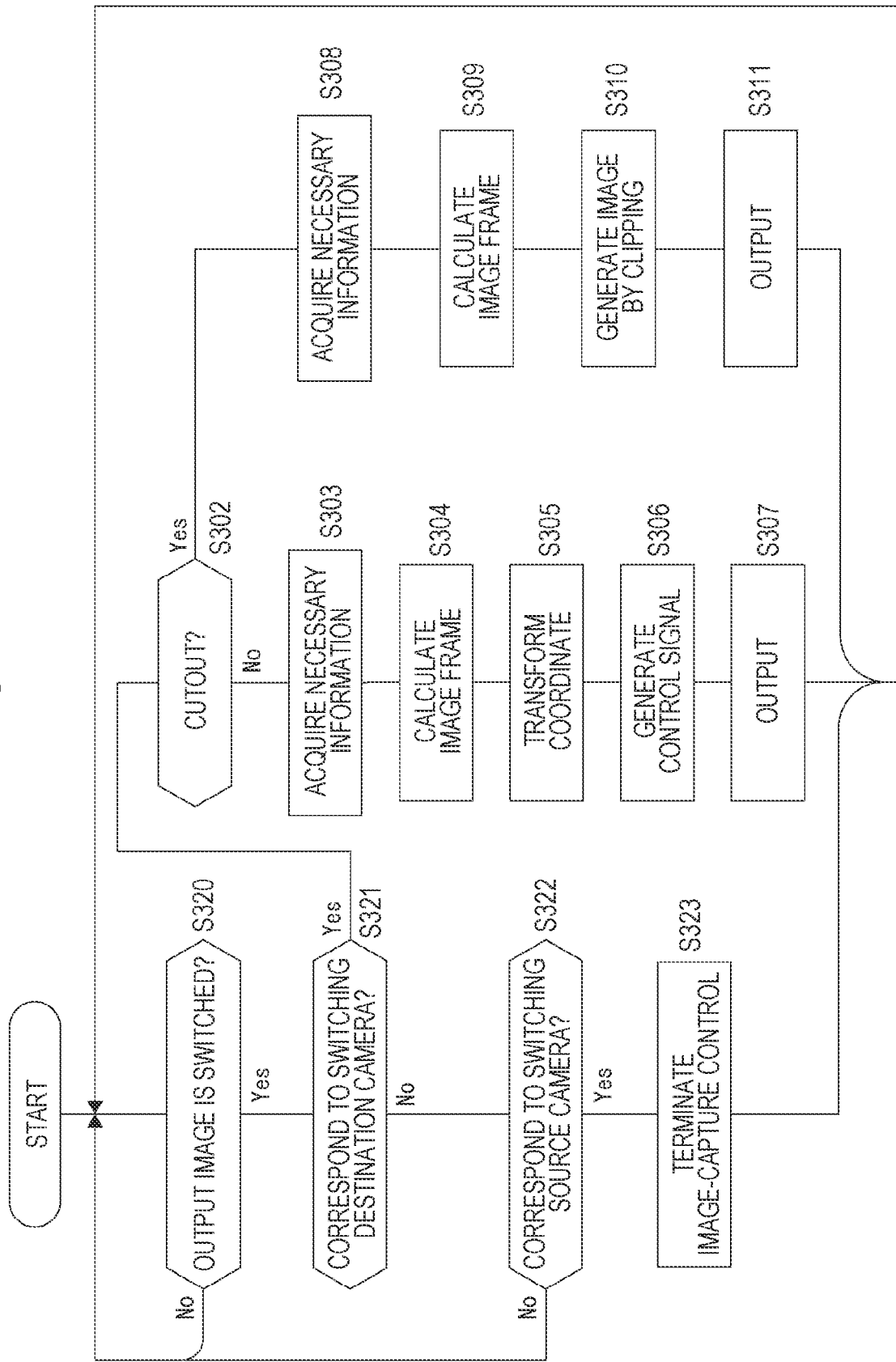
FIG. 24 is a flowchart illustrating a processing example in a case where image-capture control is performed on the basis of control information regarding switching of an output image by a switcher.

Note that, as in the processing in FIG. 23 described above, the CPU 11 performs the processing illustrated in FIG. 24 for each camera of the CAM 1 to the CAM 7. Furthermore, in FIG. 24, processing similar to the processing already described with reference to FIG. 23 is denoted by the same step number, and no description will be given of such processing.

In this case, the CPU 11 checks whether or not the output image is switched in step S320. This check processing can be performed on the basis of the selection information from the switcher 5.

In a case where the output image is not switched, the CPU 11 performs the processing in step S320 again.

On the other hand, in a case where the output image is switched, the CPU 11 proceeds to step S321 and determines whether or not it corresponds to a switching destination camera.

In a case where it is determined to correspond to the switching destination camera, the CPU 11 performs the processing in step S302 and the subsequent steps already described with reference to FIG. 23. At this time, in the necessary information acquisition processing (S303, S308) and the image frame calculation processing (S304, S309), processing corresponding to the execution instruction button Bm brought into the selected state in advance on the operation screen Gm is performed. In a case where there is a plurality of the execution instruction buttons Bm brought into the selected state in advance, necessary information corresponding to each of the execution instruction buttons Bm in the selected state is acquired in the necessary information acquisition processing, and the image frame corresponding to a combination of the execution instruction buttons Bm is calculated in the image frame calculation processing.

In this case, the CPU 11 returns to step S320 in both a case where the output processing in step S307 is performed and a case where the output processing in step S311 is performed.

With the processing as described above, the image-capture control corresponding to the execution instruction button Bm is (automatically) started at a timing of switching the output image for a camera that becomes the switching destination of the output image determined by the switcher 5.

Furthermore, in step S321 described above, in a case where it is determined not to correspond to the switching destination camera, the CPU 11 proceeds to step S322 and determines whether or not it corresponds to the switching source camera.

In a case where it is determined in step S322 not to correspond to the switching source camera (that is, neither the switching destination camera nor the switching source camera), the CPU 11 returns to step S320. That is, in this case, the processing waits until the output image is switched again.

On the other hand, in a case where it is determined in step S322 to correspond to the switching source camera, the CPU 11 proceeds to step S323 and perform image-capture control termination processing. That is, processing of terminating the image-capture control corresponding to the execution instruction button Bm that is started upon the selection as the switching destination camera is performed.

Performing the termination processing in step S323 makes it possible to terminate, at a timing deviating from the selection of the output image, the image-capture control that has been performed so far. That is, it is possible to prevent the image-capture control corresponding to the execution instruction button Bm from being performed unintentionally for a camera whose captured image is not selected as the output image.

Here, examples of the switcher 5 include a switcher that can select not only an output image as a so-called "program (PGM) out" but also a next output candidate image as a "preview".

In this case, the image-capture control corresponding to the execution instruction button Bm can also be performed in response to the switching to such a next output candidate image. Specifically, in response to the selection of the next output candidate image by the switcher 5, image-capture control for the image-capture source camera of the captured image selected as the next output candidate image is started.

Furthermore, in the above description, the example where all the execution instruction buttons Bm are subject to the image-capture control on the basis of the control information regarding the switching of the output image by the switcher 5 has been given, but only the execution instruction button Bm corresponding to the option of "rendering" can be subject to the image-capture control. Specifically, for the switching destination camera, in a case where the execution instruction button Bm pertaining to the image-capture rendering such as "automatic gradual zoom" or "hand-held feeling" is in the selected state, image-capture control according to the execution instruction button Bm is started, and when the switching destination camera becomes the switching source camera, the image-capture control is terminated.

In this case, the CPU 11 performs the processing described with reference to FIG. 24 only for the execution instruction button Bm corresponding to the option of "rendering", and performs the processing illustrated in FIG. 23 for the execution instruction buttons Bm corresponding to the option of "target" and the option of "image-capture target range" other than the option of "rendering".

It is conceivable that the image processing system 100 that switches the output image among the images captured by the plurality of cameras may employ a configuration where a list of images captured by the plurality of cameras is displayed so as to make the output image selectable from the list of captured images, but in this case, for example, it is assumed that it is difficult to check the image if rendering or the like that gives a blur in order to give a hand-held feeling is applied. On the other hand, for the option pertaining to the image-capture target such as "target", even in a state where the captured image is not selected as the output image (that is, a non-output state), for example, in a case of a camera that captures A, it is desirable that a staff member such as a director can check the state of the image that captures A, and it is therefore preferable that the image-capture control be in execution.

As described above, if the object to be subject to the image-capture control on the basis of the control information regarding the switching of the output image by the switcher 5 is only the option pertaining to "rendering", it is possible to prevent the control pertaining to the image-capture rendering from being performed on the captured image in the non-output state. It is therefore possible to improve the ease of the image check at the time of selecting the output image.

5. Modification (5-1. First Modification)

Here, in the above description, the case where only one set of operation panels in which the execution instruction buttons Bm are deployed for each camera can be displayed on the operation screen Gm has been given as an example, but the operation screen Gm can be a screen on which a plurality of sets of operation panels can be displayed. Then, in this case, it is possible to receive the selection of the execution instruction button Bm using the selection and setting reception screen Gs for each set (for each operation panel).

An example of such a set setting will be described with reference to FIGS. 25 to 27.

In this case, it is assumed that two types of screens including the operation screen Gm as illustrated in FIG. 7 and an operation screen GmA as illustrated in FIG. 27 can be displayed as the screen on which the execution instruction buttons Bm are deployed.

In FIG. 27, as with the operation screen Gm, the operation screen GmA is provided with the operation panel Pm that is a section where the execution instruction button Bm is deployed for each camera. A difference from the operation screen Gm is that a set selection button Bs for selecting the operation panel Pm is provided.

The set selection button Bs is provided for each displayable operation panel Pm, and the user can call (display), by operating any set selection button Bs, a corresponding operation panel Pm on the operation screen GmA. As described below, name information as a "set name" can be set to each set selection button by a user operation.

Such an operation screen GmA allows any operation panel Pm to be called onto the screen from the plurality of operation panels Pm having different deployment combinations of the execution instruction buttons Bm according to the type of an image-capture purpose, the type of an image-capture target scene, or the like.

An example of a GUI for the set setting will be described with reference to FIGS. 25 and 26.

Figure 25:
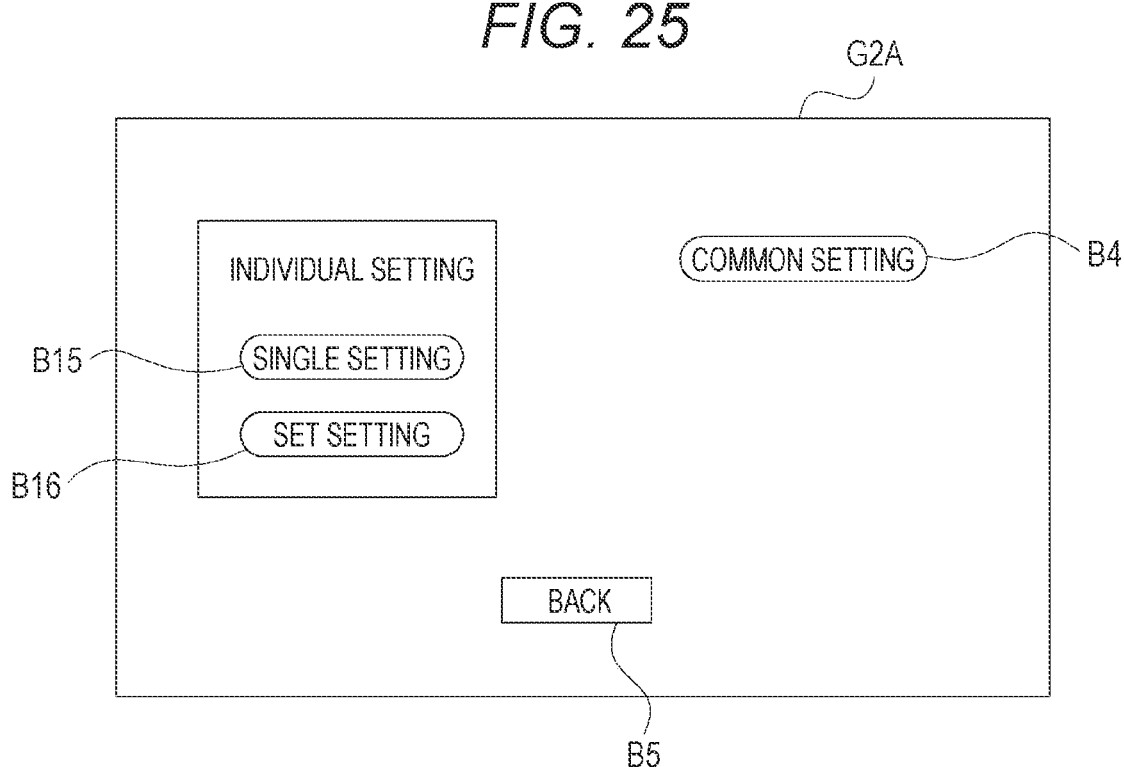
FIG. 25 is a diagram illustrating an example of a setting menu screen adapted to a set setting.

FIG. 25 illustrates an example of a setting menu screen G2A adapted to the set setting.

As illustrated in the drawing, the setting menu screen G2A is different from the setting menu screen G2 illustrated in FIG. 13 in that a single setting button B15 and a set setting button B16 are provided as individual setting buttons. The user can give, by operating the single setting button B15, an instruction to call the selection and setting reception screen Gs for selecting the execution instruction button Bm to be deployed for the operation screen Gm on which only a single operation panel can be displayed.

Figure 26:
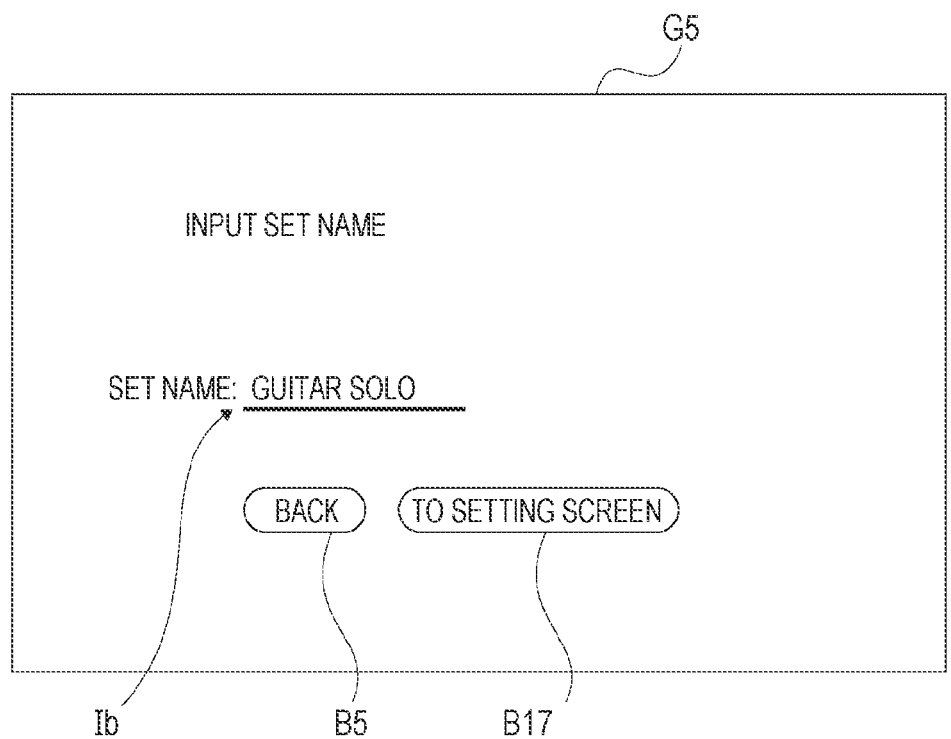
FIG. 26 is a diagram illustrating an example of a set name setting screen.

On the other hand, the user can give, by operating the set setting button B16, an instruction to transition to a set name setting screen G5 as illustrated in FIG. 26.

In FIG. 26, the set name setting screen G5 is provided with an input box Ib in which a set name can be input, a back button B5 (a button for returning to the setting menu screen G2A in FIG. 25), and a "to setting screen" button B17.

The user inputs any name information to the set name input box Ib, and then operates the "to setting screen" button B17.

In a case where the "to setting screen" button B17 is operated, the display unit 17 is caused to display the selection and setting reception screen Gs for receiving the selection of the execution instruction button Bm to be deployed and the setting of the control information regarding a specific execution instruction button Bm for the set (operation panel Pm) to which the information input to the input box Ib is set as the set name.

In a case where the selection of the execution instruction button Bm and the setting of the control information on the selection and setting reception screen Gs are completed, the information processing device 1 stores the selection and setting information with the selection and setting information associated with the information regarding the set name.

It is therefore possible to receive the selection of the button to be deployed and the setting of the control information for each set, and in a case where the set selection button Bs is operated on the operation screen GmA illustrated in FIG. 27, the operation panel Pm on which the execution instruction button Bm corresponding to the set indicated by the set selection button Bs is deployed can be displayed.

Figure 28:
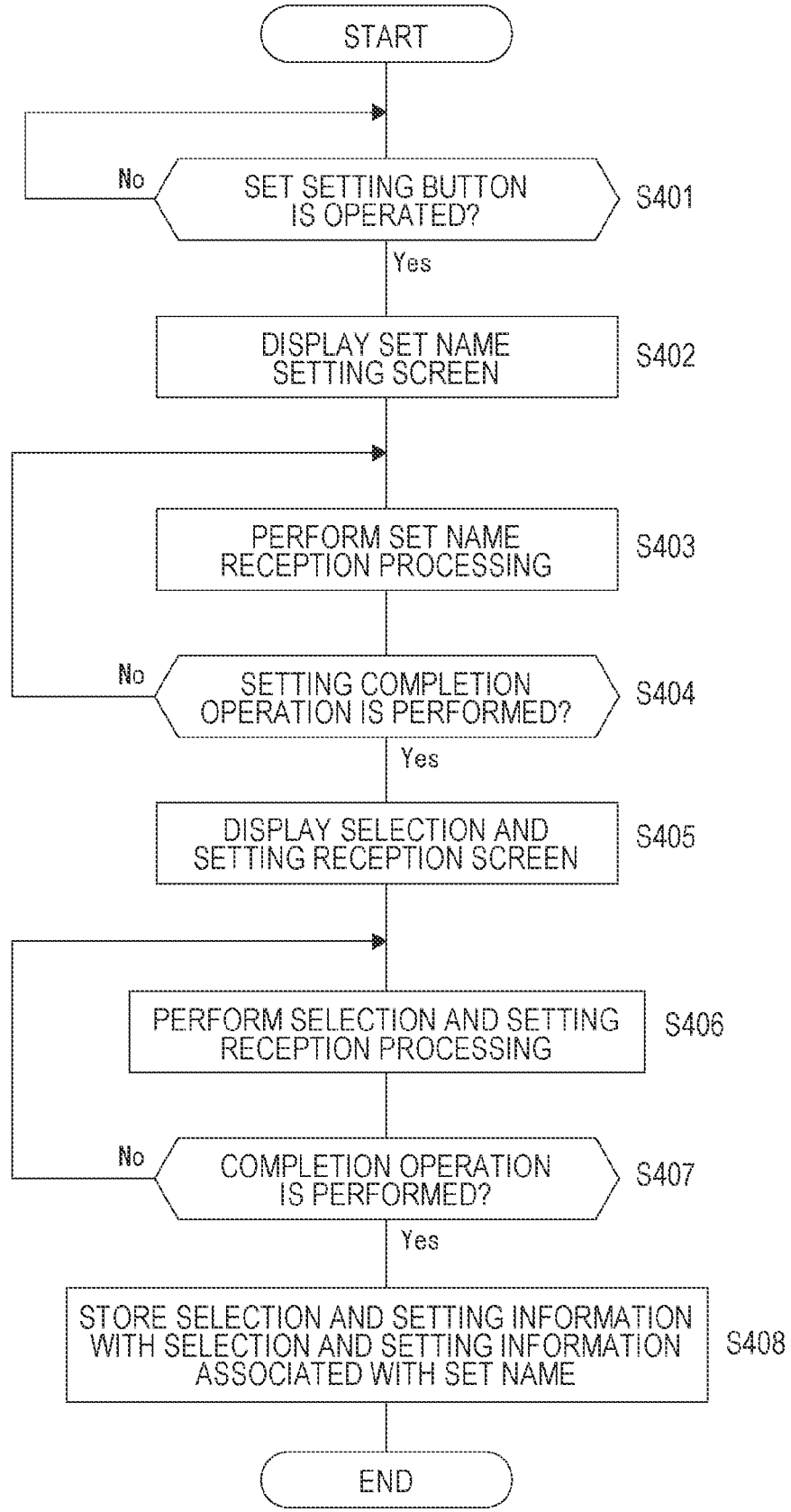
FIG. 28 is a flowchart illustrating an example of a processing procedure for enabling the set setting.

FIG. 28 is a flowchart illustrating an example of a processing procedure for achieving the set setting as described above.

First, in step S401, the CPU 11 waits until the set setting button B16 (see FIG. 25) is operated, and performs, in a case where the set setting button B16 is operated, processing of displaying the set name setting screen G5 (see FIG. 26) in step S402.

In step S403 subsequent to step S402, the CPU 11 performs, as set name reception processing, processing of receiving the information input to the input box Ib on the set name setting screen G5.

Then, in step S404 subsequent to step S403, the CPU 11 checks whether or not the setting completion operation, that is, the operation of the "to setting screen" button B17 is performed. In a case where it is determined that the operation of the "to setting screen" button B17 is not performed, and thus the setting completion operation is not performed, the CPU 11 performs the set name reception processing in step S403 again.

On the other hand, in a case where it is determined that the operation of the "to setting screen" button B17 is performed, and thus the setting completion operation is performed, the CPU 11 proceeds to step S405 and performs the processing of displaying the selection and setting reception screen Gs.

The point that the selection and setting reception processing is kept in execution until the completion operation is performed after the processing of displaying the selection and setting reception screen Gs is performed (S406, S407) is similar to the case of FIG. 22 (see S102, S103).

In a case where it is determined in step S407 that the completion operation is performed, the CPU 11 proceeds to step S408 and performs processing of storing the selection and setting information with the selection and setting information associated with the set name. That is, the processing of storing the information regarding the set name set by the processing in steps S403 and S404 and the selection and setting information, that is, the selection information regarding the execution instruction button Bm for each camera received in the selection and setting reception processing in step S406 and the control information set for each selected specific execution instruction button Bm, into a predetermined storage device such as the non-volatile memory unit 14 or the storage unit 19 with the information regarding the set name and the selection and setting information associated with each other is performed.

In response to the execution of the processing in step S408, the CPU 11 brings the series of processing illustrated in FIG. 28 to an end.

Here, when a set name is newly set, the CPU 11 additionally displays the set selection button Bs indicating the set name on the operation screen GmA. In a case where any set selection button Bs among the plurality of set selection buttons Bs is operated on the operation screen GmA, the CPU 11 performs processing of displaying the operation panel Pm on which the execution instruction button Bm is deployed on the operation screen GmA in accordance with the selection and setting information stored with the selection and setting information associated with the set name of the operated set selection button Bs.

Enabling the set setting as described above allows the user to set in advance the execution instruction button Bm to be deployed on the operation panel Pm for each predetermined type such as the type of the image-capture purpose or the type of the image-capture target scene and display the operation panel Pm corresponding to the type of the purpose on the operation screen GmA at the time of operation.

Here, the set selection button Bs can function not as the selection button of the operation panel Pm but as a button for switching the selected state of the execution instruction button Bm deployed in one operation panel Pm.

Specifically, it is conceivable that, in response to the selection of a set selection button Bs of "guitar solo", the execution instruction button Bm of "guitar" may be brought into the selected state for all the cameras for which the execution instruction button Bm of "guitar" is deployed in the option of "target", and, in response to the selection of a set selection button Bs of "drum solo", the execution instruction button Bm of "drum" may be brought into the selected state for all the cameras for which the execution instruction button Bm of "drum" is deployed in the option of "target".

(5-2. Second Modification)

Figure 29:
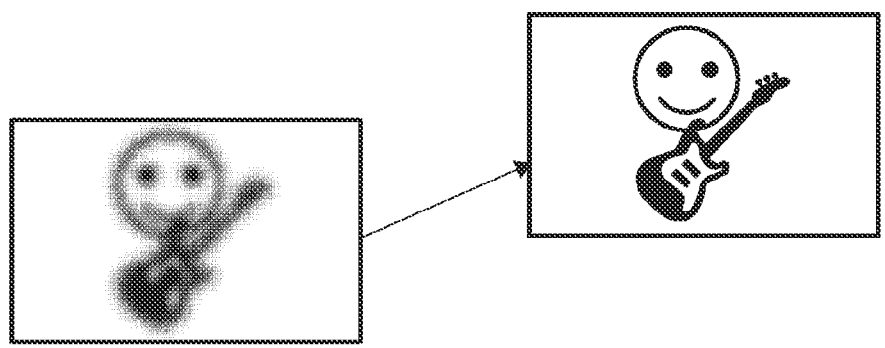
FIG. 29 is an explanatory diagram of a second modification.

Although the function of "gradual zoom" has been given above as an example of the function pertaining to the image-capture rendering, a function of "gradual focus" that slowly changes a focus state can also be employed as the function pertaining to the image-capture rendering, for example. Specifically, as illustrated in FIG. 29, it is conceivable that the focus state may gradually change from an out-of-focus state to an in-focus state, for example.

For such "gradual focus", it is conceivable that whether the focus state is changed from the out-of-focus state or changed from the in-focus state to the out-of-focus state may be set. Furthermore, it is also conceivable that a rate or period of change in the focus state may be set.

(5-3. Third Modification)

Although "UP", "BS", "WS", "FF", and "wide" have been given above as examples of "image-capture target range", the information indicating the image-capture target range can also be information indicating a range in which an image of an instrument is captured in a case where the instrument is in use by a person subject to "subject tracking" or the like.

Figure 30:
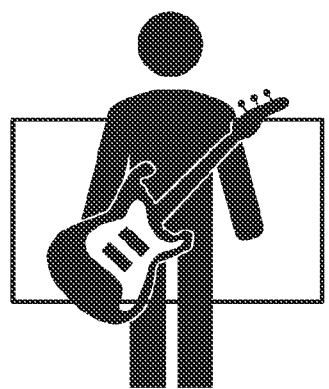
FIG. 30 is an explanatory diagram of a third modification.

For example, as illustrated in FIG. 30, information indicating a range in which an image of a guitar that is in use by a guitar player is mainly captured or the like can be given as an example.

At this time, it is conceivable that the range in which the image of the instrument that is in use by the target person is captured may be set on the basis of information regarding an image-capture range of the instrument recognized by analysis of the captured image. Alternatively, in a case of the guitar (or bass) illustrated in FIG. 30 or the like, the position of the guitar relative to the human body remains almost unchanged during use, so that it is also conceivable that the range may be set as a range that mainly covers a specific region (for example, a region from the chest to the waist) on the basis of the result of the bone estimation of the target person.

(5-4. Fourth Modification)

Furthermore, an adjustment operation element for making fine adjustments to composition can be deployed on the operation screen Gm (or the operation screen GmA).

For example, FIG. 31 illustrates an example where, as such an adjustment operation element, an adjustment operation element Aj1 using a cross key is deployed.

Here, it is conceivable that the fine adjustments in this case may correspond to a function effective only for the slave camera 3.

Furthermore, it is conceivable that the fine adjustments in this case may correspond to a function effective only when "image-capture target range" is designated. The adjustment range is, for example, about 200 pixels in the vertical and horizontal directions. A single touch on the adjustment operation element Aj1 causes movement by five pixels. When the operation of designating again "image-capture target range" that has already been designated is performed, the composition is returned to the composition of "image-capture target range".

In a case where the adjustment operation element Aj1 is consecutively touched during a change in composition, the first and second touches are effective, but the subsequent consecutive touches are ineffective (in order to prevent the composition from continuously changing due to a time lag even if it is intended to interrupt the adjustments).

In a case where the adjustment operation element Aj1 is kept pressed, a change in image-capture direction in the designated direction is continued, and the change is brought into a gradual stop upon release of the pressing.

(5-5. Other Modifications)

Here, the embodiment is not limited to the specific examples described above, and configurations as various modifications may be employed.

For example, in the above description, the case where the information processing device 1 serves as both the entity that performs the display control of the operation screen Gm on which the execution instruction button Bm is deployed and the entity that performs the image-capture control according to the operation of the execution instruction button Bm has been given as an example, but such execution entities may be separate devices.

Furthermore, in the above description, the rendering pertaining to the angle of view, the focus, and the hand-held feeling (camera shake) has been given as an example of the image-capture rendering, but, for example, it is conceivable that the image-capture rendering may include a rendering such as slowly changing composition when changing the composition in the vertical and horizontal directions.

Note that such a rendering pertaining to the rate of change in composition can also be applied to a cutout image. For example, for the cutout image, the example where an image containing all subjects as performers (see FIGS. 4 and 5) is generated has been given for the CAM 2, but in this case, for the cutout image, the clipping position of the image may change in at least either the vertical or horizontal direction according to the movement of the subject. As described above, even in a case where the composition changes in either the vertical or horizontal direction for the image of the virtual camera, it is also possible to apply the rendering of causing the composition to slowly change.

In the above description, the case where an event being the image-capture target is a music live show has been given as an example, but the present technology can also be suitably applied to a case where another event such as program recording in a studio or a sport such as baseball, soccer, or basketball is the image-capture target.

6. Program

Although the information processing device (1) as the embodiment has been described above, a program of the embodiment is a program that causes a computer device such as a CPU to perform processing as the information processing device 1.

The program of the embodiment is a program readable by a computer device and causes the computer device to implement a function of performing image-capture control on the basis of image-capture rendering information indicating a change in captured image and image-capture target information indicating an image-capture target.

That is, this program corresponds to, for example, a program for causing the computer device to perform the processing described in FIGS. 23, 24, and the like.

Such a program can be prestored in a storage medium readable by the computer device, such as a ROM, a hard disk drive (HDD), or a solid state drive (SSD). Alternatively, the program can be temporarily or permanently held (stored) in a removable storage medium such as a semiconductor memory, a memory card, an optical disc, a magneto-optical disk, or a magnetic disk. Such a removable storage medium can be provided as so-called package software.

Furthermore, such a program can be installed from the removable storage medium to a personal computer or the like, or can be downloaded from a download site to a required information processing device such as smartphone over a network such as a LAN or the Internet.

7. Summary of Embodiment

As described above, an information processing device (1) as the embodiment includes a control unit (the image frame calculation unit F6, the coordinate calculation unit F7, the pan head and camera control unit F8, and the cutout image generation unit F9) configured to perform image-capture control on the basis of image-capture rendering information indicating a change in captured image and image-capture target information indicating an image-capture target.

With the above-described configuration, it is possible to perform, as the image-capture control, control with consideration given to rendering.

It is therefore possible to perform image-capture control to enhance an immersive feeling for a captured image, so as to handle a case where content such as a music live show that requires an immersive feeling is the image-capture target.

Furthermore, in the information processing device as an embodiment, the image-capture target information includes information indicating a person being the image-capture target.

With this configuration, it is possible to perform the image-capture control for a person.

It is therefore possible to perform image-capture control so as to enhance an immersive feeling for content such as a music live show in which a person is the image-capture target.

Moreover, in the information processing device as the embodiment, the person being the image-capture target is a person selected from among candidates.

With this configuration, it is possible to perform the image-capture control for a specific person (for example, a person having a specific role such as a guitar player or a bass player, a specific individual among persons having the same role, or the like) among persons who can be the image-capture target, such as a specific performer in a music live show.

It is therefore possible to achieve image-capture control for a specific person.

Still furthermore, in the information processing device as the embodiment, the person being the image-capture target is a person recognized in a designated area of an image-capture target space.

With this configuration, it is possible for the user to perform, by designating the area from the image-capture target space without selecting a target person, the image-capture control for the person recognized in the designated area.

It is therefore possible to improve usability pertaining to the designation of a person being the image-capture target.

Furthermore, in the information processing device as the embodiment, the image-capture target information includes information indicating a position in an image-capture target space.

For example, there is a case where it is desired that the image-capture control target is not a specific object but a specific position in the image-capture target space.

With the above-described configuration, it is possible to handle such a case.

Moreover, in the information processing device as the embodiment, the image-capture target information includes information indicating an image-capture target range pertaining the person being the image-capture target.

It is possible to designate a range as to which part of the person being the image-capture target is contained in the captured image.

It is therefore possible to improve the degree of freedom in the composition designation.

Still furthermore, in the information processing device as the embodiment, the information indicating the image-capture target range corresponds to information indicating a range in which an image of an instrument is captured in a case where the instrument is in use by the person being the image-capture target (see FIG. 30).

With this configuration, it is possible to obtain a captured image focusing on the instrument that is in use by the person being the image-capture target, for example, to obtain a captured image in which a guitar in use by a guitar player is zoomed in on.

It is therefore possible to achieve, as image-capture control for the image-capture target range pertaining to the person being the image-capture target, image-capture control suitable for a scene.

Furthermore, in the information processing device as the embodiment, the image-capture control includes at least any one of pan control, tilt control, or zoom control for a real camera.

With this configuration, it is possible to perform control to change the image-capture direction of the real camera or change the angle of view of the captured image as the image-capture control based on the image-capture rendering information and the image-capture target information.

Moreover, in the information processing device as the embodiment, the image-capture control includes image-clipping control for an image captured by the real camera.

With this configuration, it is possible to perform control to change the composition of the image captured by the virtual camera as the image-capture control based on the image-capture rendering information and the image-capture target information.

Still furthermore, in the information processing device as the embodiment, the image-capture rendering information includes rendering information regarding zoom.

With this configuration, it is possible to achieve a rendering using a zoom function, for example, to achieve a change in captured image in which the target subject is gradually zoomed in on.

It is therefore possible to give a rendering effect using the zoom function to the captured image, and it is possible to enhance an immersive feeling for the captured image accordingly.

Furthermore, in the information processing device as the embodiment, the image-capture rendering information corresponds to information including at least any one of a zoom speed, a zoom start angle of view, or a zoom end angle of view.

With this configuration, it is possible to designate at least any one of the zoom speed, the zoom start angle of view, or the zoom end angle of view for an effect of the rendering using the zoom function.

It is therefore possible to improve the degree of freedom in rendering using the zoom function.

Moreover, in the information processing device as the embodiment, the image-capture rendering information includes rendering information camera shake.

With this configuration, it is possible to achieve a rendering as if the image is captured by a hand-held camera.

It is therefore possible to enhance an immersive feeling for the captured image.

Still furthermore, in the information processing device as the embodiment, the image-capture rendering information includes rendering information regarding focus (see FIG. 29).

With this configuration, it is possible to achieve a rendering using a focus function, for example, to achieve a change in the captured image in which a focus state of the target subject gradually changes from an out-of-focus state to an in-focus state.

It is therefore possible to give a rendering effect using the focus function to the captured image, and it is possible to enhance an immersive feeling for the captured image accordingly.

Furthermore, the information processing device as the embodiment further includes a selection reception unit (F2) configured to receive selection of information to be applied to the image-capture control from among a plurality of types of information for at least any one of the image-capture rendering information or the image-capture target information, in which the selection reception unit performs display control of a selection reception screen for receiving selection of the information to be applied.

It is possible to select the information to be applied to the image-capture control from among the plurality of types of information for at least any one of the image-capture rendering information or the image-capture target information, so that it is possible to achieve image-capture control suitable for the image-capture target.

Furthermore, selecting information to be applied to the image-capture control makes it possible to display only information of the selected type among all types of information on the operation screen for the image-capture control, and it is therefore possible to prevent deterioration in operability on the operation screen.

Moreover, in the information processing device as the embodiment, a plurality of cameras to be subject to the image-capture control is provided, and the selection reception unit performs, as the display control of the selection reception screen, display control of a screen capable of receiving the selection for each of the cameras (see FIGS. 15 and 16).

With the above-described configuration, it is possible to receive the selection of the image-capture rendering information and the image-capture target information for each camera.

It is possible to perform control different for each camera as the image-capture control based on the image-capture rendering information and the image-capture target information.

Still furthermore, the information processing device as the embodiment further includes an operation screen display control unit (F3) configured to perform, as the image-capture control, display control of an operation panel on which an execution instruction operation element of control based on the image-capture rendering information or the image-capture target information selected on the selection reception screen is deployed, in which the selection reception unit is capable of receiving a plurality of sets of the selection for each of the cameras, and the operation screen display control unit performs control to display the operation panel for each of the sets (see FIGS. 25 to 28).

This configuration allows the user to set in advance the execution instruction operation element to be deployed on the operation panel for each predetermined type such as the type of the image-capture purpose or the type of the image-capture target scene and display the operation panel corresponding to the type of the purpose on the screen at the time of operation.

It is therefore possible to implement a user interface suitable for a case where it is desired to give an execution instruction of image-capture control using an operation panel on which different execution instruction operation elements are deployed for each predetermined type.

Furthermore, the information processing device as the embodiment functions as a part of an image processing system capable of switching an output image among images captured by a plurality of cameras, in which the control unit performs, on the basis of control information regarding the switching of the output image, the image-capture control based on the image-capture rendering information (see FIG. 24).

It is conceivable that the image processing system that switches the output image among the images captured by the plurality of cameras may employ a configuration where a list of images captured by the plurality of cameras is displayed so as to make the output image selectable from the list of captured images, but in this case, for example, it is assumed that it is difficult to check the image if a rendering or the like that gives a blur in order to give a hand-held feeling is applied. If the control pertaining to the image-capture rendering is performed on the basis of the control information regarding the switching of the output image as described above, it is possible to prevent the control pertaining to the image-capture rendering from being performed on the captured image (image in the non-output state) that is not selected as the output image.

It is therefore possible to improve the ease of the image check at the time of selecting the output image.

Furthermore, it is possible to prevent the image-capture control from being performed unintentionally for the captured image in the non-output state, and it is therefore possible to improve the efficiency of the image-capture control.

Moreover, in the information processing device as the embodiment, the control unit starts, in response to selection of the output image or a next output candidate image from among the images captured by the plurality of cameras, the control for an image-capture source camera of the selected captured image.

With this configuration, the image-capture control for the image-capture source camera of the captured image is started at the timing when the captured image is estimated to be the output image.

It is therefore possible to prevent the image-capture control from being performed unintentionally, and it is therefore possible to improve the efficiency of the image-capture control.

Furthermore, an information processing method as an embodiment includes causing an information processing device to perform image-capture control on the basis of image-capture rendering information indicating a change in captured image and image-capture target information indicating an image-capture target.

With such an information processing method, it is also possible to obtain functions and effects similar to the functions and effects of the information processing device as the above-described embodiment.

Furthermore, a program as an embodiment is readable by a computer device, the program causing the computer device to implement a function of performing image-capture control on the basis of image-capture rendering information indicating a change in captured image and image-capture target information indicating an image-capture target.

With such a program, it is possible to cause the computer device to function as the information processing device as the above-described embodiment.

Note that the effects described herein are merely examples and are not limited, and other effects may be provided.

8. Present Technology

Note that the present technology can also have the following configurations.

(1)

An information processing device including a control unit configured to perform image-capture control on the basis of image-capture rendering information indicating a change in captured image and image-capture target information indicating an image-capture target.

(2)

In the information processing device according to the above (1), the image-capture target information includes information indicating a person being the image-capture target.

(3)

In the information processing device according to the above (2), the person being the image-capture target is a person selected from among candidates.

(4)

In the information processing device according to the above (2), the person being the image-capture target is a person recognized in a designated area of an image-capture target space.

(5)

In the information processing device according to the above (1), the image-capture target information includes information indicating a position in an image-capture target space.

(6)

In the information processing device according to any one of the above (2) to (4), the image-capture target information includes information indicating an image-capture target range pertaining the person being the image-capture target.

(7)

In the information processing device according to the above (6), the information indicating the image-capture target range corresponds to information indicating a range in which an image of an instrument is captured in a case where the instrument is in use by the person being the image-capture target.

(8)

In the information processing device according to any one of the above (1) to (7), the image-capture control includes at least any one of pan control, tilt control, or zoom control for a real camera.

(9)

In the information processing device according to any one of the above (1) to (7), the image-capture control includes image-clipping control for an image captured by a real camera.

(10)

In the information processing device according to any one of the above (1) to (9)

the image-capture rendering information includes rendering information regarding zoom.

(11)

In the information processing device according to the above (10), the image-capture rendering information corresponds to information including at least any one of a zoom speed, a zoom start angle of view, or a zoom end angle of view.

(12)

In the information processing device according to any one of the above (1) to (11), the image-capture rendering information includes rendering information regarding camera shake.

(13)

In the information processing device according to any one of the above (1) to (12), the image-capture rendering information includes rendering information regarding focus.

(14)

The information processing device according to any one of the above (1) to (13), further including a selection reception unit configured to receive selection of information to be applied to the image-capture control from among a plurality of types of information for at least any one of the image-capture rendering information or the image-capture target information, in which the selection reception unit performs display control of a selection reception screen for receiving selection of the information to be applied.

(15)

In the information processing device according to the above (14), a plurality of cameras to be subject to the image-capture control is provided, and the selection reception unit performs, as the display control of the selection reception screen, display control of a screen capable of receiving the selection for each of the cameras.

(16)

The information processing device according to the above (15), further including an operation screen display control unit configured to perform, as the image-capture control, display control of an operation panel on which an execution instruction operation element of control based on the image-capture rendering information or the image-capture target information selected on the selection reception screen is deployed, in which the selection reception unit is capable of receiving a plurality of sets of the selection for each of the cameras, and the operation screen display control unit performs control to display the operation panel for each of the sets.

(17)

The information processing device according to any one of the above (1) to (16), the information processing device functioning as a part of an image processing system capable of switching an output image among images captured by a plurality of cameras, in which the control unit performs, on the basis of control information regarding the switching of the output image, the image-capture control based on the image-capture rendering information.

(18)

In the information processing device according to the above (17), the control unit starts, in response to selection of the output image or a next output candidate image from among the images captured by the plurality of cameras, the control for an image-capture source camera of the selected captured image.

(19)

An information processing method including causing an information processing device to perform image-capture control on the basis of image-capture rendering information indicating a change in captured image and image-capture target information indicating an image-capture target.

(20)

A program readable by a computer device, the program causing the computer device to implement a function of performing image-capture control on the basis of image-capture rendering information indicating a change in captured image and image-capture target information indicating an image-capture target.

REFERENCE SIGNS LIST

100 Image processing system
1 Information processing device
2 Master camera
3, 3-1, 3-2, 3-3, 3-4 Slave camera
4, 4-1, 4-2, 4-3, 4-4 Pan head
5 Switcher
6 Position detection device
6a Receiver
11 CPU
12 ROM
13 RAM
14 Non-volatile memory unit
15 Input/output interface
16 Input unit
17 Display unit
18 Audio output unit
19 Storage unit
20 Communication unit
21 Drive
22 Removable storage medium
23 Bus
Gm, GmA Operation screen
Gs Selection and setting reception screen
Gc Common setting screen
Bm Execution instruction button
SL Slider
T1, T2, T3, T4, T5, T6, T7 Tab
cb Check box
F2 Selection reception unit
F3 Operation screen display control unit
F5 Image recognition processing unit
F6 Image frame calculation unit
F7 Coordinate calculation unit
F8 Pan head and camera control unit
F9 Cutout image generation unit
Pm Operation panel

The invention claimed is:

1. An information processing device comprising:
circuitry configured to:
acquire image-capture rendering information indicating a change in visual rendering mode pertaining to captured image and image-capture target information including information indicating a person being an image-capture target and information indicating an image-capture target range pertaining to a range in which part of the person is contained in the captured image; and
perform image-capture control to track and capture the person being the image-capture target so that the part of the person indicated by the image-capture target range is included in the captured image based on the acquired image-capture target range with an image-capture rendering mode corresponding to the image-capture rendering information.

2. The information processing device according to claim 1, wherein
the person being the image-capture target is a person selected from among candidates.

3. The information processing device according to claim 1, wherein
the person being the image-capture target is a person recognized in a designated area of an image-capture target space.

4. The information processing device according to claim 1, wherein
the image-capture target information includes information indicating a position in an image-capture target space.

5. The information processing device according to claim 1, wherein
the information indicating the image-capture target range corresponds to information indicating a range of positions relative to the person in which an image of an instrument is captured in a case where the instrument is in use by the person being the image-capture target.

6. The information processing device according to claim 1, wherein
the image-capture control includes at least any one of pan control, tilt control, or zoom control for a real camera.

7. The information processing device according to claim 1, wherein
the image-capture control includes image-clipping control for an image captured by a real camera.

8. The information processing device according to claim 1, wherein
the image-capture rendering information includes rendering information regarding zoom.

9. The information processing device according to claim 8, wherein
the image-capture rendering information corresponds to information including at least any one of a zoom speed, a zoom start angle of view, or a zoom end angle of view.

10. The information processing device according to claim 1, wherein
the image-capture rendering information includes rendering information regarding camera shake.

11. The information processing device according to claim 1, wherein
the image-capture rendering information includes rendering information regarding focus.

12. The information processing device according to claim 1, wherein the circuitry is further configured to:
receive selection of information to be applied to the image-capture control from among a plurality of types of information for at least any one of the image-capture rendering information or the image-capture target information; and
perform display control of a selection reception screen for receiving selection of the information to be applied.

13. The information processing device according to claim 12, wherein
a plurality of cameras to be subject to the image-capture control is provided, and
the circuitry is further configured to receive the selection of the image-capture target, the image-capture target range, or the image-capture rendering mode corresponding to each camera of the plurality of cameras.

14. The information processing device according to claim 13, wherein
the circuitry is further configured to perform, as the image-capture control, display control of an operation panel on which an execution instruction operation element of control based on the image-capture rendering information or the image-capture target information selected on the selection reception screen is deployed,
the circuitry is capable of receiving a plurality of sets of the selection for each of the cameras, and
the circuitry is further configured to perform control to display the operation panel for each of the sets.

15. The information processing device according to claim 1, the information processing device functioning as a part of an image processing system capable of switching an output image among images captured by a plurality of cameras, wherein
the circuitry is further configured to perform, on a basis of control information regarding the switching of the output image, the image-capture control based on the image-capture rendering information.

16. The information processing device according to claim 15, wherein
the circuitry is further configured to start, in response to selection of the output image or a next output candidate image from among the images captured by the plurality of cameras, the control for an image-capture source camera of the selected captured image.

17. An information processing method comprising:
acquiring image-capture rendering information indicating a change in visual rendering mode pertaining to captured image and image-capture target information including information indicating a person being an image-capture target and information indicating an image-capture target range pertaining to a range in which part of the person is contained in the captured image; and
performing image-capture control to track and capture the person being the image-capture target so that the part of the person indicated by the image-capture target range is included in the captured image based on the acquired image-capture target range with an image-capture rendering mode corresponding to the image-capture rendering information.

18. A non-transitory computer-readable medium having embodied thereon a program, which when executed by a computer causes the computer to execute an information processing method, the method comprising:
acquiring image-capture rendering information indicating a change in visual rendering mode pertaining to captured image and image-capture target information including information indicating a person being an image-capture target and information indicating an image-capture target range pertaining to a range in which part of the person is contained in the captured image; wherein
performing image-capture control to track and capture the person being the image-capture target so that the part of the person indicated by the image-capture target range is included in the captured image based on the acquired image-capture target range with an image-capture rendering mode corresponding to the image-capture rendering information.

19. The information processing device according to claim 13, wherein
the circuitry is further configured to perform, as the display control of the selection reception screen, display control of a screen capable of receiving the selection for the plurality of cameras.

20. The information processing device according to claim 1,
wherein the circuitry is further configured to perform image-capture control as a composition based on the image-capture target, the image-capture target range, and the image-capture rendering information.

21. The information processing device according to claim 20, wherein
the circuitry is further configured to receive the selection of rate of change in composition and perform image-capture control changing from current composition to other composition based on the rate of change in the composition.

22. The information processing device according to claim 20, wherein
the circuitry is further configured to perform image-capture control to maintain the current composition for a predetermined time.

* * * * *